(12) United States Patent
Silverbrook

(10) Patent No.: US 7,566,113 B2
(45) Date of Patent: *Jul. 28, 2009

(54) INKJET NOZZLE INCORPORATING SERPENTINE ACTUATOR

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 76 days.

This patent is subject to a terminal disclaimer.

(21) Appl. No.: 11/778,572

(22) Filed: Jul. 16, 2007

(65) Prior Publication Data

US 2008/0012903 A1 Jan. 17, 2008

Related U.S. Application Data

(63) Continuation of application No. 11/349,074, filed on Feb. 8, 2006, now Pat. No. 7,255,424, which is a continuation of application No. 10/982,789, filed on Nov. 8, 2004, now Pat. No. 7,086,720, which is a continuation of application No. 10/421,823, filed on Apr. 24, 2003, now Pat. No. 6,830,316, which is a continuation of application No. 09/113,122, filed on Jul. 10, 1998, now Pat. No. 6,557,977.

(30) Foreign Application Priority Data

Jul. 15, 1997 (AU) .................................. PO7991
Jul. 15, 1997 (AU) .................................. PO8004

(51) Int. Cl.
B41J 2/04 (2006.01)
B41J 2/05 (2006.01)

(52) U.S. Cl. ........................................... 347/54; 347/65
(58) Field of Classification Search .................... 347/54, 347/56, 65

See application file for complete search history.

(56) References Cited

U.S. PATENT DOCUMENTS

| | | | |
|---|---|---|---|
| 4,032,929 A | 6/1977 | Fischbeck et al. |
| 4,210,920 A | 7/1980 | Burnett et al. |
| 4,460,905 A | 7/1984 | Thomas |
| 4,576,111 A | 3/1986 | Slomianny |
| 4,633,267 A | 12/1986 | Meinhof |
| 4,684,913 A | 8/1987 | Yaeger |
| 4,723,131 A | 2/1988 | Droit |
| 4,737,802 A | 4/1988 | Mielke |
| 5,719,604 A | 2/1998 | Inui et al. |
| 5,828,275 A | 10/1998 | Kita et al. |
| 5,903,380 A | 5/1999 | Motamedi et al. |
| 5,982,521 A | 11/1999 | Bessho et al. |

(Continued)

FOREIGN PATENT DOCUMENTS

DE 3245283 A 6/1984

(Continued)

*Primary Examiner*—An H Do

(57) ABSTRACT

A nozzle is provided for an inkjet printer. The nozzle includes a roof layer which defines a nozzle port through which ink can be ejected. An endless substrate layer is fast with the roof layer and defines a nozzle chamber wall which tapers inwardly toward the nozzle port. An actuator assembly is fast with the endless substrate layer and includes an endless support. The actuator assembly further includes a serpentine coil element cantilevered to extend from the endless support. The serpentine coil element is configured to bend away from the nozzle port during quiescence and straighten during actuation to eject ink through the nozzle port.

7 Claims, 25 Drawing Sheets

U.S. PATENT DOCUMENTS

| | | |
|---|---|---|
| 6,174,050 B1 | 1/2001 | Kashino et al. |
| 6,481,821 B1 | 11/2002 | Yun et al. |
| 6,557,977 B1 | 5/2003 | Silverbrook |
| 6,574,958 B1 | 6/2003 | MacGregor |
| 7,140,719 B2 * | 11/2006 | Silverbrook .................. 347/54 |
| 7,364,271 B2 * | 4/2008 | Silverbrook .................. 347/54 |

FOREIGN PATENT DOCUMENTS

| | | |
|---|---|---|
| DE | 4139731 | 6/1993 |
| EP | 0189794 A | 8/1986 |
| EP | 0371763 A2 | 6/1990 |
| EP | 0417673 A | 3/1991 |
| EP | 0479441 A | 4/1992 |
| EP | 0671271 A | 9/1995 |
| GB | 1569425 A | 6/1980 |
| GB | 2262152 | 6/1993 |
| JP | 55-059972 A | 7/1980 |
| JP | 59-093356 A | 5/1984 |
| JP | 60-131254 A | 7/1985 |
| JP | 03-202351 A | 12/1989 |
| JP | 02-034342 A | 2/1990 |
| JP | 02-150353 A | 6/1990 |
| JP | 02-219655 A | 9/1990 |
| JP | 02-265751 A | 10/1990 |
| JP | 02-273241 A | 11/1990 |
| JP | 03-065349 A | 3/1991 |
| JP | 04-001051 A | 1/1992 |
| JP | 04-126255 A | 4/1992 |
| JP | 04-129745 A | 4/1992 |
| JP | 04-357039 A | 12/1992 |
| JP | 04-368851 A | 12/1992 |
| JP | 05-318724 A | 12/1993 |
| JP | 06-106725 A | 4/1994 |
| JP | 06-134985 A | 5/1994 |
| JP | 06-336011 A | 12/1994 |
| SE | 9601403 | 10/1997 |
| WO | WO 86/05722 | 10/1986 |
| WO | WO 97/12689 A | 4/1997 |

* cited by examiner

INKJET NOZZLE INCORPORATING SERPENTINE ACTUATOR

CROSS REFERENCE TO RELATED APPLICATION

The present application is a continuation of U.S. application Ser. No. 11/349,074 filed on Feb. 8, 2006, now issued as U.S. Pat. No. 7,255,424 which is a continuation of U.S. application Ser. No. 10/982,789 filed on Nov. 8, 2004, now issued as U.S. Pat. No. 7,086,720, which is a continuation of U.S. application Ser. No. 10/421,823 filed on Apr. 24, 2003, now issued as U.S. Pat. No. 6,830,316, which is a continuation of U.S. application Ser. No. 09/113,122 filed on Jul. 10, 1998, now issued as U.S. Pat. No. 6,557,977 all of which are herein incorporated by reference.

CROSS REFERENCES TO RELATED APPLICATIONS

The following US Patents and US Patent Applications are hereby incorporated by cross-reference.

| U.S. PAT. NO./PATENT APPLICATION Incorporated by Reference: |
| --- |
| 6750901 |
| 6476863 |
| 6788336 |
| 6322181 |
| 6597817 |
| 6227648 |
| 6727948 |
| 6690419 |
| 6727951 |
| 6196541 |
| 6195150 |
| 6362868 |
| 6831681 |
| 6431669 |
| 6362869 |
| 6472052 |
| 6356715 |
| 6894694 |
| 6636216 |
| 6366693 |
| 6329990 |
| 6459495 |
| 6137500 |
| 6690416 |
| 7050143 |
| 6398328 |
| 7110024 |
| 6431704 |
| 6879341 |
| 6415054 |
| 6665454 |
| 6542645 |
| 6486886 |
| 6381361 |
| 6317192 |
| 6850274 |
| 09/113054 |
| 6646757 |
| 6624848 |
| 6357135 |
| 6271931 |
| 6353772 |
| 6106147 |
| 6665008 |
| 6304291 |
| 6305770 |
| 6289262 |
| 6315200 |
| 6217165 |
| 6786420 |
| 6350023 |
| 6318849 |
| 6227652 |
| 6213588 |
| 6213589 |
| 6231163 |
| 6247795 |
| 6394581 |
| 6244691 |
| 6257704 |
| 6416168 |
| 6220694 |
| 6257705 |
| 6247794 |
| 6234610 |
| 6247793 |
| 6264306 |
| 6241342 |
| 6247792 |
| 6264307 |
| 6254220 |
| 6234611 |
| 6302528 |
| 6283582 |
| 6239821 |
| 6338547 |
| 6247796 |
| 6557977 |
| 6390603 |
| 6362843 |
| 6293653 |
| 6312107 |
| 6227653 |
| 6234609 |
| 6238040 |
| 6188415 |
| 6227654 |
| 6209989 |
| 6247791 |
| 6336710 |
| 6217153 |
| 6416167 |
| 6243113 |
| 6283581 |
| 6247790 |
| 6260953 |
| 6267469 |
| 6224780 |
| 6235212 |
| 6280643 |
| 6284147 |
| 6214244 |
| 6071750 |
| 6267905 |
| 6251298 |
| 6258285 |
| 6225138 |
| 6241904 |
| 6299786 |
| 6866789 |
| 6231773 |
| 6190931 |
| 6248249 |
| 6290862 |
| 6241906 |
| 6565762 |
| 6241905 |
| 6451216 |
| 6231772 |
| 6274056 |
| 6290861 |
| 6248248 |
| 6306671 |
| 6331258 |

-continued

| U.S. PAT. NO./PATENT APPLICATION Incorporated by Reference: |
|---|
| 6110754 |
| 6294101 |
| 6416679 |
| 6264849 |
| 6254793 |
| 6235211 |
| 6491833 |
| 6264850 |
| 6258284 |
| 6312615 |
| 6228668 |
| 6180427 |
| 6171875 |
| 6267904 |
| 6245247 |
| 6315914 |
| 6231148 |
| 6293658 |
| 6614560 |
| 6238033 |
| 6312070 |
| 6238111 |
| 6378970 |
| 6196739 |
| 6270182 |
| 6152619 |
| 6087638 |
| 6340222 |
| 6041600 |
| 6299300 |
| 6067797 |
| 6286935 |
| 6044646 |
| 6382769 |

FIELD OF THE INVENTION

This invention relates to the use of a shape memory alloy in a micro-electromechanical fluid ejection device.

The present invention also relates to ink jet printing and in particular discloses a shape memory alloy ink jet printer.

The present invention further relates to the field of drop on demand ink jet printing.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal was printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207-220 (1988).

Ink Jet printers themselves come in many different types. The utilisation of a continuous stream ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of a continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed ink jet printing techniques rely upon the activation of an electrothermal actuator which results in the creation of a bubble in a constricted space, such as a nozzle, which thereby causes the ejection of ink from an aperture connected to the confined space onto a relevant print media. Manufacturers such as Canon and Hewlett Packard manufacture printing devices utilizing the electro-thermal actuator.

As can be seen from the foregoing, many different types of printing technologies are available. Ideally, a printing technology should have a number of desirable attributes. These include inexpensive construction and operation, high-speed operation, safe and continuous long-term operation etc. Each technology may have its own advantages and disadvantages in the areas of cost, speed, quality, reliability, power usage, simplicity of construction operation, durability and consumables.

SUMMARY OF THE INVENTION

It is an object of the present invention to provide for a new form of ink jet printing device that utilizes a shape memory alloy in its activation method.

According to a first aspect of the invention, there is provided a micro-electromechanical fluid ejection device which comprises a wafer substrate;

drive circuitry positioned on the wafer substrate;

a nozzle chamber structure arranged on the wafer substrate to define a nozzle chamber and a fluid ejection port in fluid communication with the nozzle chamber; and a fluid ejection member that is operatively positioned with respect to the nozzle chamber such that displacement of the fluid ejection member results in the ejection of fluid from the fluid ejection port, wherein at least a portion of the fluid ejection member is of a shape memory alloy which defines an electrical heating circuit and which is connected to the drive circuitry to be heated by an electrical current received from the drive circuitry, the shape memory alloy being displaceable towards the fluid ejection port when heated to transform from its martensitic phase to its austenitic phase to eject fluid from the fluid ejection port.

The nozzle chamber structure may be defined partly by the substrate which is etched to define walls of the nozzle chamber. The substrate may include a structural layer which is etched to define the fluid ejection port.

The heating circuit defined by the shape memory alloy may be interposed between a pair of structural layers. One of the structural layers may be pre-stressed so that, upon release, the fluid ejection member is drawn away from the fluid ejection port while the shape memory alloy is in the martensitic phase.

The structural layers may be of a resiliently flexible material which is configured so that the shape memory alloy can be drawn away from the fluid ejection port when the heating circuit cools and the alloy becomes martensitic.

The heating circuit defined by the shape memory alloy may trace a serpentine path from one via to another, the via providing an electrical connection to the heating circuit.

The nozzle chamber may be in fluid communication with a fluid reservoir. One of the structural layers may form part of a fluid passivation layer that covers the drive circuitry layer to protect the drive circuitry layer from fluid damage.

In accordance with a second aspect of the present invention there is provided a method of ejecting ink from a chamber comprising the steps of: a) providing a cantilevered beam actuator incorporating a shape memory alloy; and b) transforming said shape memory alloy from its martensitic phase to its austenitic phase or vice versa to cause the ink to eject from said chamber. Further, the actuator comprises a conductive shape memory alloy panel in a quiescent state and which transfers to an ink ejection state upon heating thereby causing said ink ejection from the chamber. Preferably, the heating occurs by means of passing a current through the shape memory alloy. The chamber is formed from a crystallographic etch of a silicon wafer so as to have one surface of the chamber substantially formed by the actuator. Advantageously, the actuator is formed from a conductive shape memory alloy arranged in a serpentine form and is attached to one wall of the chamber opposite a nozzle port from which ink is ejected. Further, the back etching of a silicon wafer to the epitaxial layer and etching a nozzle porthole in the epitaxial layer forms the nozzle port. The crystallographic etch includes providing side wall slots of non-etched layers of a processed silicon wafer so as to extend the dimensions of the chamber as a result of the crystallographic etch process. Preferably, the shape memory alloy comprises nickel titanium alloy.

By way of background, reference is made to U.S. patent application Ser. No. 09/113,097 by the applicant. It is an object of the invention of that application to provide an alternative form of drop on demand ink jet printing utilising a reverse spring lever arrangement to actuate the ejection of ink from a nozzle chamber.

In accordance with a third aspect of that invention, there is provided an ink jet printing nozzle apparatus with a connected ink supply chamber, the apparatus comprising an ink ejection means having one surface in fluid communication with the ink in the nozzle chamber, a recoil means connected to the ink ejection means and a first actuator means connected to the ink ejection means. The method of ejecting ink from the ink chamber comprises the steps of activation of the first actuator means which drives the ink ejection means from a quiescent position to a pre-firing position and deactivation of the first actuator means, causing the recoil means to drive the ink ejection means to eject ink from the nozzle chamber through the ink ejection port. Further, the recoil means includes a resilient member and the movement of the first actuator results in resilient movement of this recoil means and the driving of the ink ejection means comprises the resilient member acting upon the ink ejection means. Preferably, the first actuator means comprises an electromagnetic actuator and the recoil means comprises a torsional spring. The ink ejection means and the first actuator are interconnected in a cantilever arrangement wherein small movements of the first actuator means result in larger movements of the ink ejection means. Advantageously, the recoil means is located substantially at the pivot point of the cantilever construction. The first actuator includes a solenoid coil surrounded by a magnetic actuator having a first mixed magnetic pole and a second moveable magnetic pole, such that, upon activation of the coil, the poles undergo movement relative to one another with the moveable magnetic pole being connected to the actuator side of the cantilever construction. Preferably, the moveable magnetic pole includes a plurality of slots for the flow of ink through the pole upon movement. The ink ejection means comprises a piston or plunger having a surface substantially mating with at least one surface of the nozzle chamber.

Also by way of background, reference is made to U.S. patent application Ser. No. 09/113,061 by the applicant. It is an object of the invention of that application to provide for an alternative form of ink jet printer which uses a linear stepper actuator to eject ink from a nozzle chamber.

In accordance with a fourth aspect of that invention, an ink jet nozzle arrangement is presented comprising: a nozzle chamber having an ink ejection port for the ejection of ink, an ink supply reservoir for supplying ink to the nozzle chamber, a plunger located within the nozzle chamber and further, a linear stepper actuator interconnected to the plunger and adapted to actuate the plunger so as to cause the ejection of ink from the ink ejection port. At least one surface of the plunger located alongside a wall of the nozzle chamber is hydrophobic. Preferably, the linear actuator interconnected to the plunger in the nozzle chamber is driven in three phases by a series of electromagnets. Preferably, a series of twelve electromagnets is arranged in opposing pairs alongside the linear actuator. Further, each phase is duplicated resulting in four electromagnets for each phase. The ink jet nozzle has an open wall along a back surface of the plunger which comprises a series of posts adapted to form a filter to filter ink flowing through the open wall into the nozzle chamber. The linear actuator construction includes a guide at the end opposite to the nozzle chamber for guiding the linear actuator.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, shape memory materials are utilised to construct an actuator suitable for injecting ink from the nozzle of an ink chamber.

Figure 1:
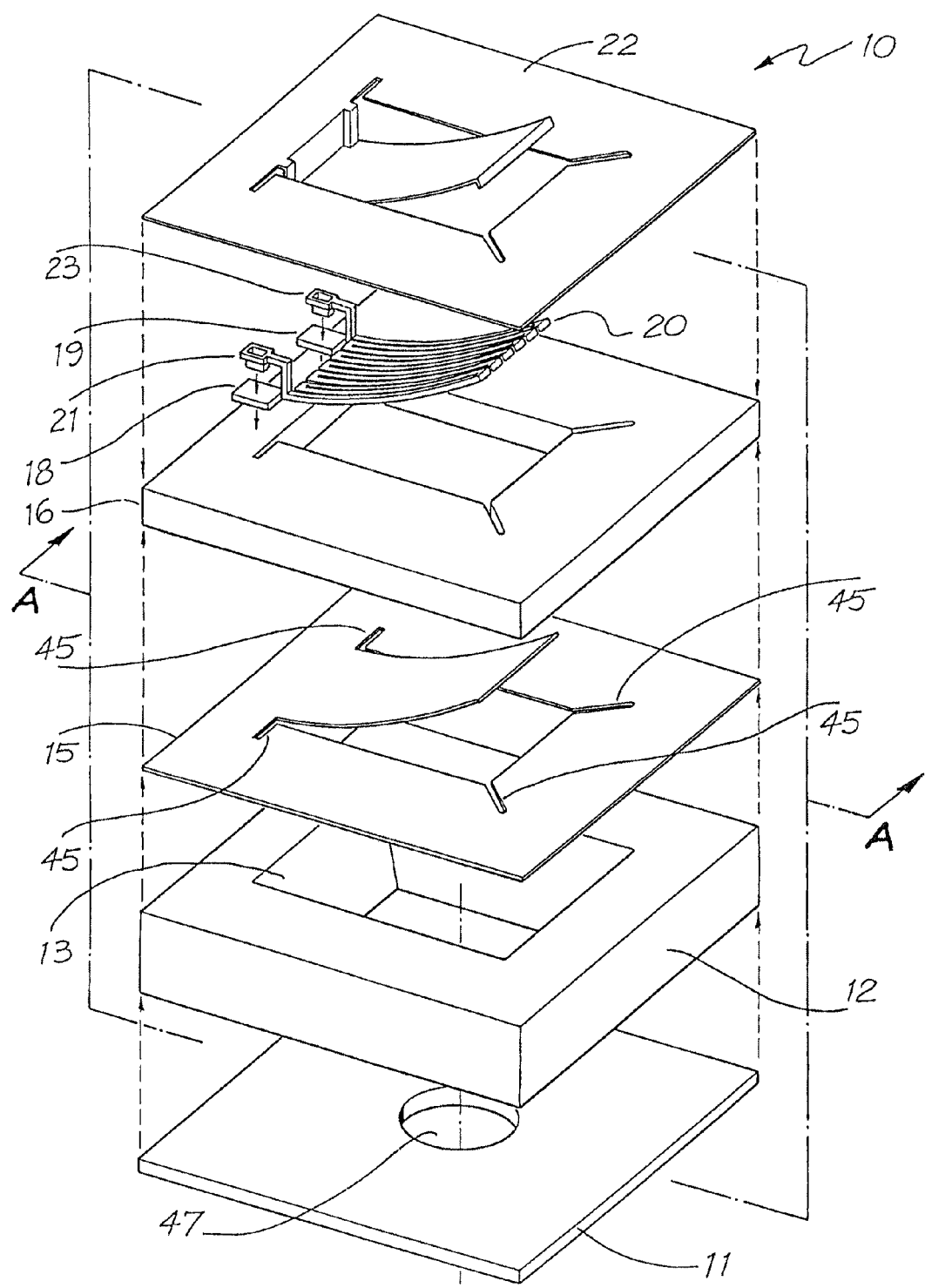
FIG. 1 is an exploded, perspective view of a single ink jet nozzle as constructed in accordance with the preferred embodiment of the invention.

Turning to FIG. 1, there is illustrated an exploded perspective view 10 of a single ink jet nozzle as constructed in accordance with the preferred embodiment. The ink jet nozzle 10 is constructed from a silicon wafer base utilizing back etching of the wafer to a boron doped epitaxial layer. Hence, the ink jet nozzle 10 comprises a lower layer 11 which is constructed from boron-doped silicon. The boron doped silicon layer is also utilized as a crystallographic etch stop layer. The next layer comprises the silicon layer 12 that includes a crystallographic pit that defines a nozzle chamber 13 having side walls etched at the conventional angle of 54.74 degrees. The layer 12 also includes the various required circuitry and transistors for example, a CMOS layer (not shown). After this, a 0.5-micron thick thermal silicon oxide layer 15 is grown on top of the silicon wafer 12.

After this, come various layers which can comprise two-level metal CMOS process layers which provide the metal interconnect for the CMOS transistors formed within the layer 12. The various metal pathways etc. are not shown in FIG. 1 but for two metal interconnects 18, 19 which provide interconnection between a shape memory alloy layer 20 and the CMOS metal layers 16. The shape memory metal layer is next and is shaped in the form of a serpentine coil to be heated by end interconnect/via portions 21,23. A top nitride layer 22 is provided for overall passivation and protection of lower layers in addition to providing a means of inducing tensile stress to curl the shape memory alloy layer 20 in its quiescent state.

The preferred embodiment relies upon the thermal transition of a shape memory alloy 20 (SMA) from its martensitic phase to its austenitic phase. The basis of a shape memory effect is a martensitic transformation from a thermoelastic martensite at a relatively low temperature to an austenite at a higher temperature. The thermal transition is achieved by passing an electrical current through the SMA. The layer 20 is suspended at the entrance to a nozzle chamber connected via leads 18, 19 to the layers 16.

Figure 2:
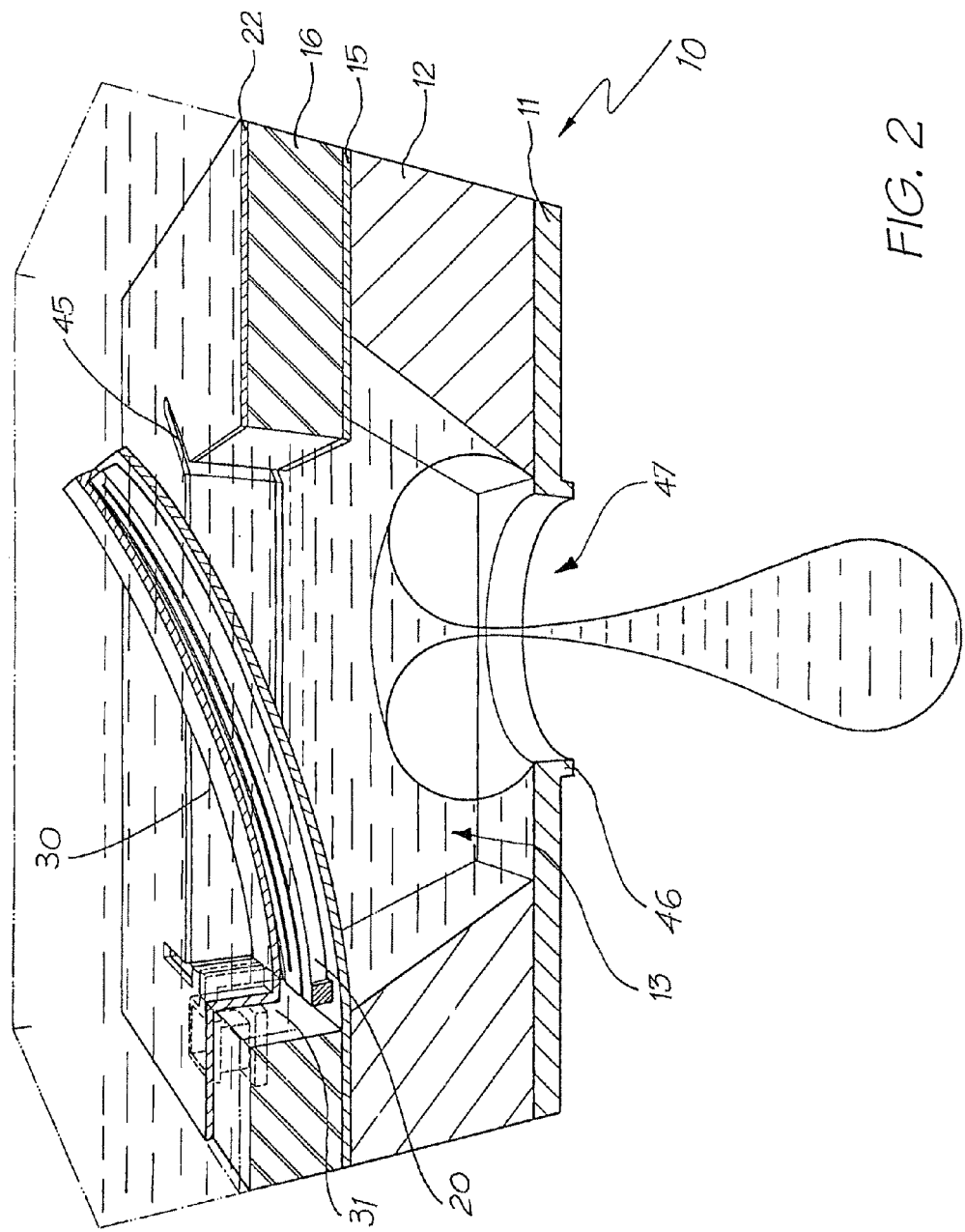
FIG. 2 is a cross-sectional view of a single ink jet nozzle in its quiescent state taken along line A-A in FIG. 1.
Figure 3:
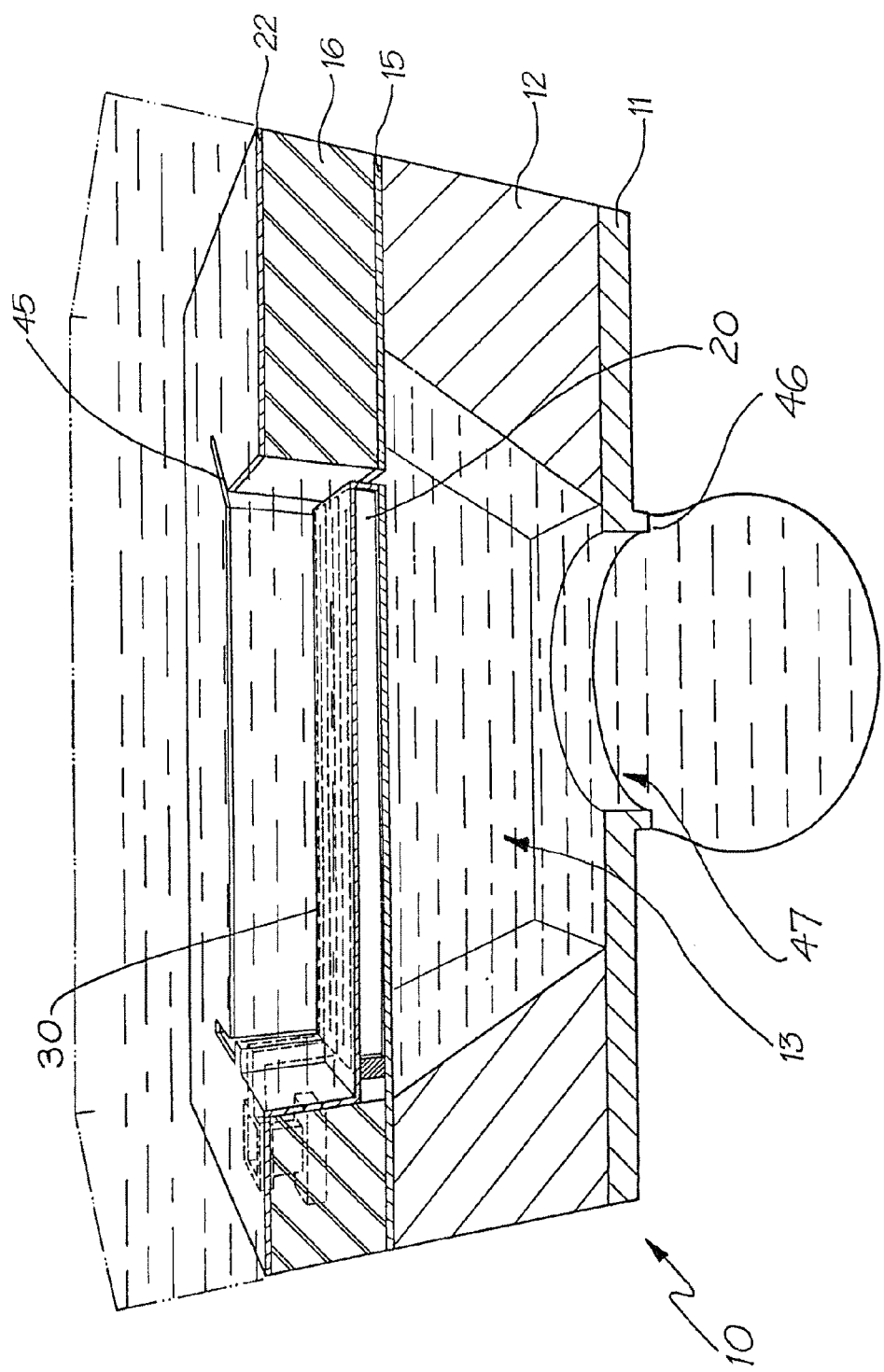
FIG. 3 is a top cross sectional view of a single ink jet nozzle in its actuated state taken along line A-A in FIG. 1.

In FIG. 2, there is shown a cross-section of a single nozzle 10 when in its quiescent state, the section being taken through the line A-A of FIG. 1. An actuator 30 that includes the layers 20, 22, is bent away from a nozzle port 47 when in its quiescent state. In FIG. 3, there is shown a corresponding cross-section for the nozzle 10 when in an actuated state. When energized, the actuator 30 straightens, with the corresponding result that the ink is pushed out of the nozzle. The process of energizing the actuator 30 requires supplying enough energy to raise the SMA layer 20 above its transition temperature so that the SMA layer 20 moves as it is transformed into its austenitic phase.

The SMA martensitic phase must be pre-stressed to achieve a different shape from the austenitic phase. For printheads with many thousands of nozzles, it is important to achieve this pre-stressing in a bulk manner. This is achieved by depositing the layer of silicon nitride 22 using Plasma Enhanced Chemical Vapour Deposition (PECVD) at around 300° C. over the SMA layer. The deposition occurs while the SMA is in the austenitic shape. After the printhead cools to room temperature the substrate under the SMA bend actuator is removed by chemical etching of a sacrificial substance. The silicon nitride layer 22 is thus placed under tensile stress and curls away from the nozzle port 47. The weak martensitic phase of the SMA provides little resistance to this curl. When the SMA is heated to its austenitic phase, it returns to the flat shape into which it was annealed during the nitride deposition. The transformation is rapid enough to result in the ejection of ink from the nozzle chamber.

There is one SMA bend actuator 30 for each nozzle. One end 31 of the SMA bend actuator 30 is mechanically connected to the substrate. The other end is free to move under the stresses inherent in the layers.

Returning to FIG. 1, the actuator layer is composed of three layers:

1. The $SiO_2$ lower layer 15. This layer acts as a stress 'reference' for the nitride tensile layer. It also protects the SMA from the crystallographic silicon etch that forms the nozzle chamber. This layer can be formed as part of the standard CMOS process for the active electronics of the printhead.

2. An SMA heater layer 20. An SMA such as a nickel titanium (NiTi) alloy is deposited and etched into a serpentine form to increase the electrical resistance so that the SMA is heated when an electrical current is passed through the SMA.

3. A silicon nitride top layer 22. This is a thin layer of high stiffness which is deposited using PECVD. The nitride stoichiometry is adjusted to achieve a layer with significant tensile stress at room temperature relative to the $SiO_2$ lower layer. Its purpose is to bend the actuator at the low temperature martensitic phase, away from the nozzle port 47.

As noted previously, the ink jet nozzle of FIG. 1 can be constructed by utilizing a silicon wafer having a buried boron epitaxial layer. The 0.5 micron thick dioxide layer 15 is then formed having side slots 45 which are utilized in a subsequent crystallographic etch. Next, the various CMOS layers 16 are formed including drive and control circuitry (not shown). The SMA layer 20 is then created on top of layers 15/16 and is connected with the drive circuitry. The silicon nitride layer 22 is then formed on the layer 20. Each of the layers 15, 16, 22 includes the various slots 45 which are utilized in a subsequent crystallographic etch. The silicon wafer is subsequently thinned by means of back etching with the etch stop being the boron-doped silicon layer 11. Subsequent etching of the layer 11 forms the nozzle port 47 and a nozzle rim 46. A nozzle chamber is formed by means of a crystallographic etch with the slots 45 defining the extent of the etch within the silicon oxide layer 12.

A large array of nozzles can be formed on the same wafer which in turn is attached to an ink chamber for filling the nozzle chambers.

Figure 4:
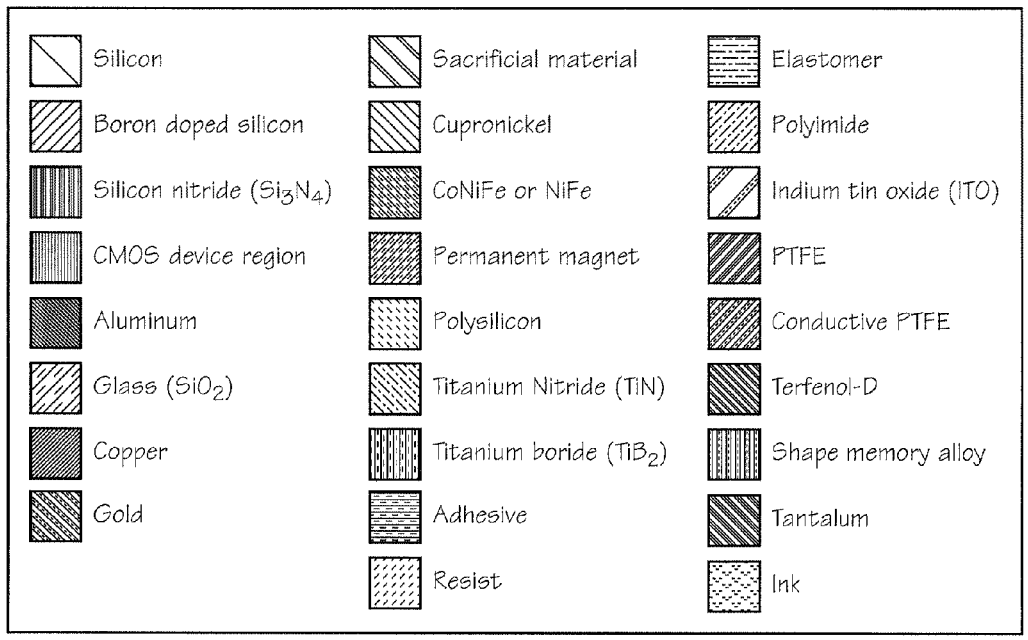
FIG. 4 provides a legend of the materials indicated in FIG. 5 to 15.
Figure 5:
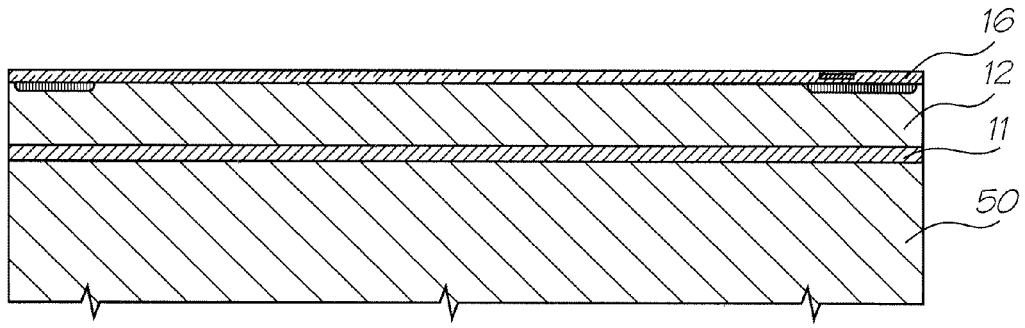
FIG. 5 to FIG. 15 illustrate sectional views of the manufacturing steps in one form of construction of an ink jet printhead nozzle.
Figure 6:
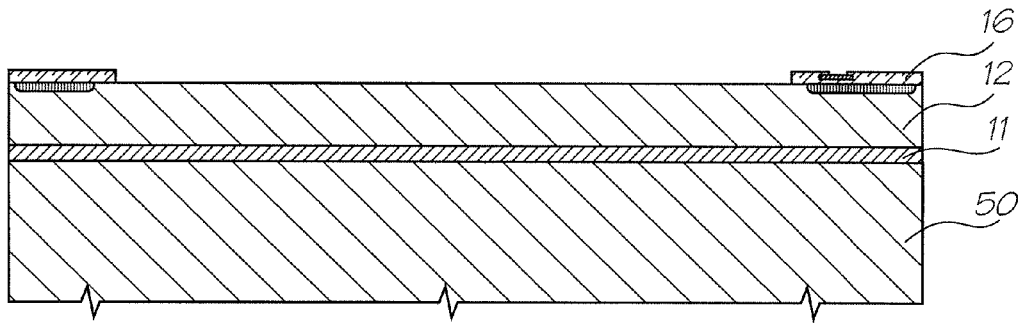
Figure 7:
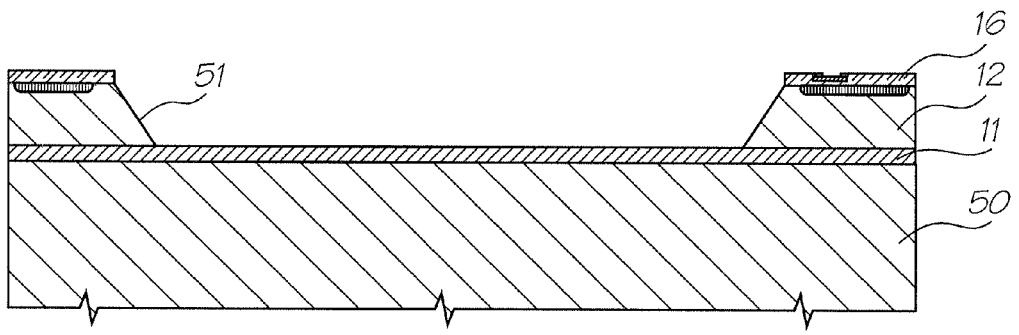
Figure 8:
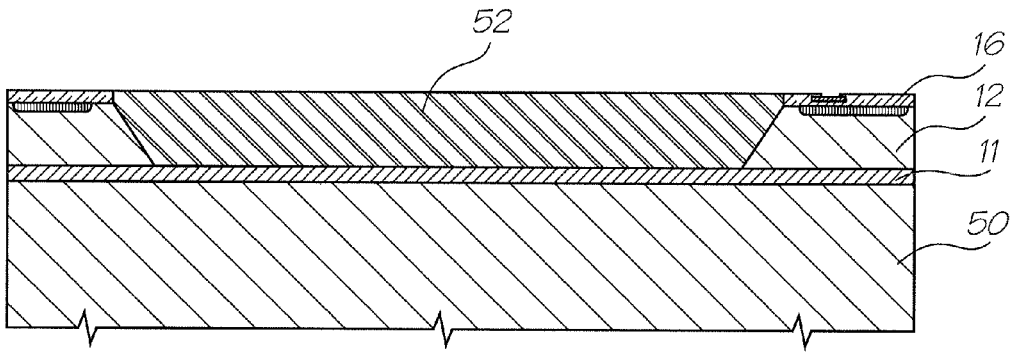
Figure 9:
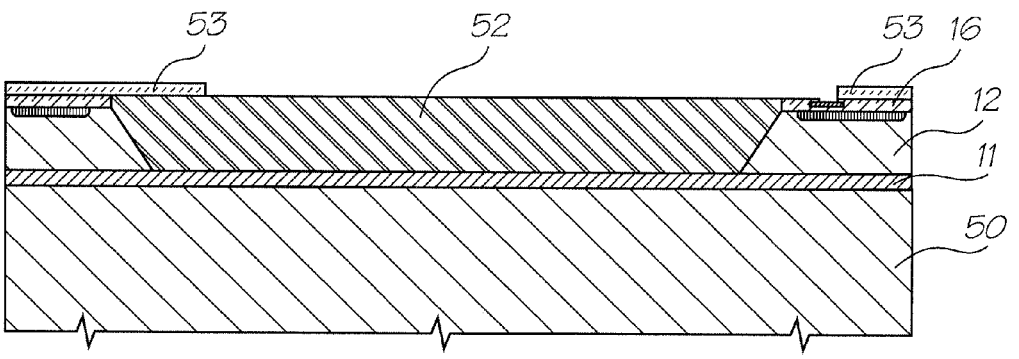
Figure 10:
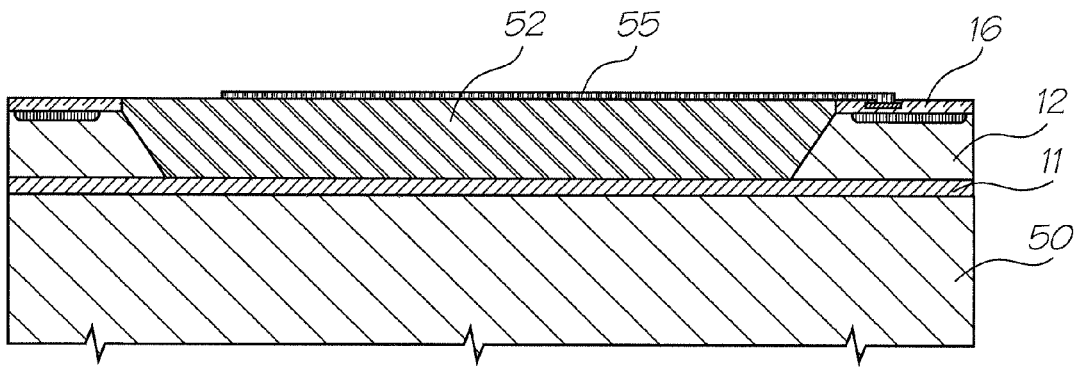
Figure 11:
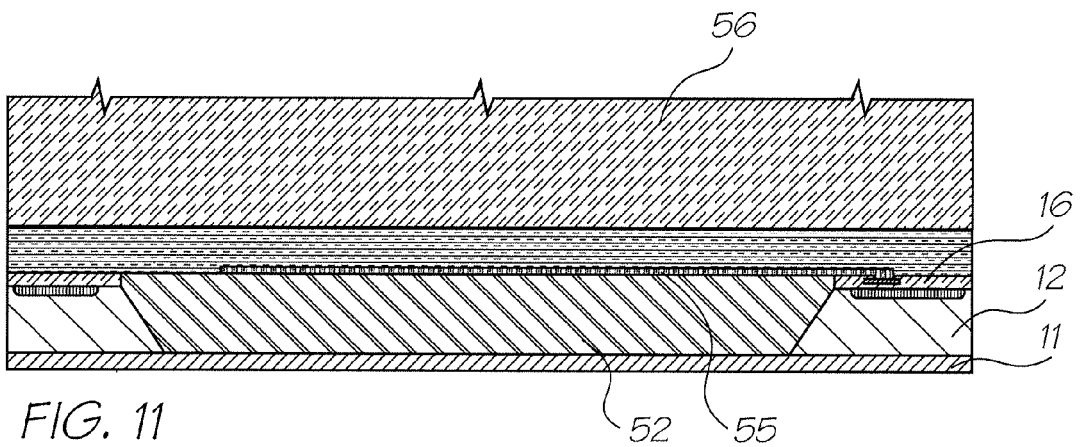
Figure 12:
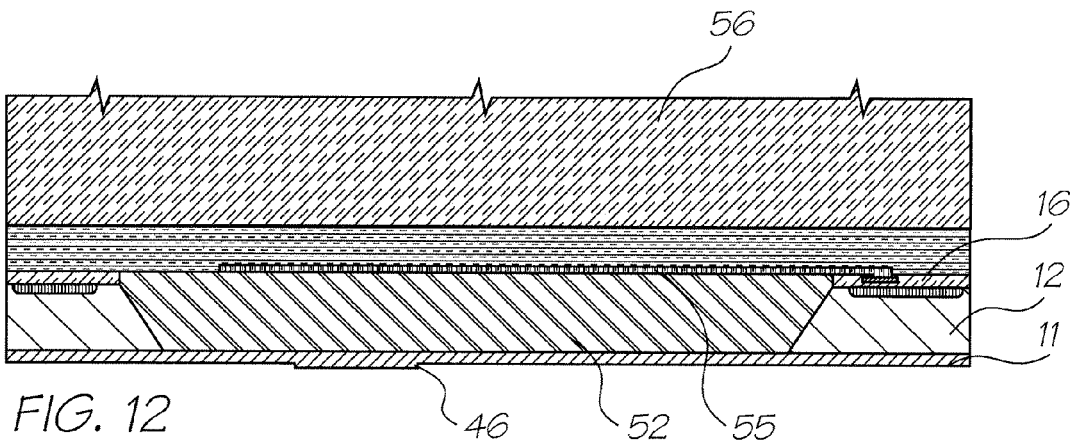
Figure 13:
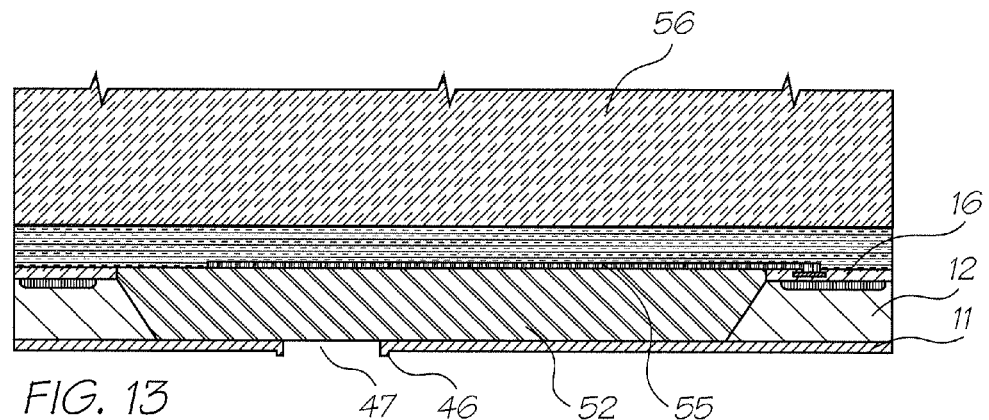
Figure 14:
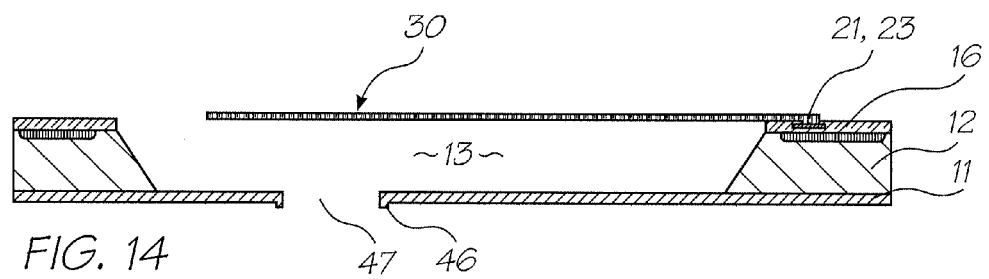
Figure 15:
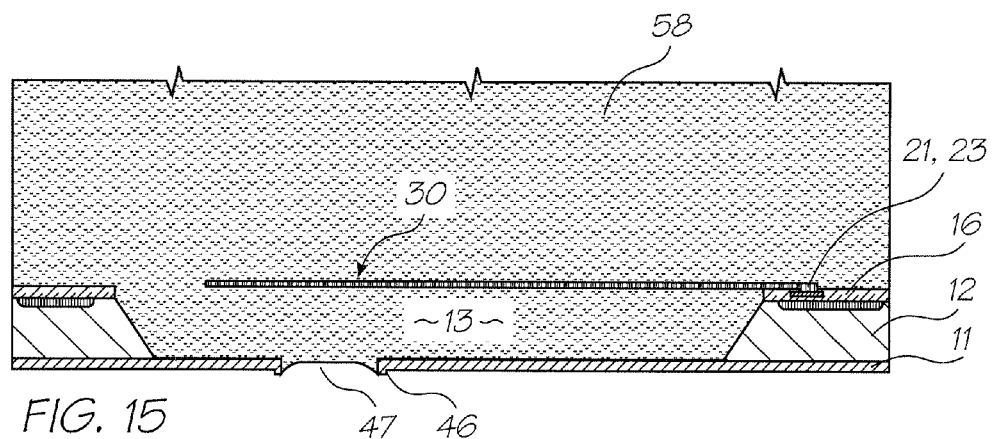

One form of detailed manufacturing process which can be used to fabricate monolithic ink jet printheads operating in accordance with the principles taught by the present embodiment can proceed utilizing the following steps:

1. Using a double-sided polished wafer 50, deposit 3 microns of epitaxial silicon 11 heavily doped with boron.
2. Deposit 10 microns of epitaxial silicon 12, either p-type or n-type, depending on the CMOS process used.
3. Complete drive transistors, data distribution, and timing circuits using a 0.5-micron, one poly, 2 metal CMOS process to define the CMOS metal layers 16. This step is shown in FIG. 5. For clarity, these diagrams may not be to scale, and may not represent a cross section though any single plane of the nozzle. FIG. 4 is a key to representations of various materials in these manufacturing diagrams, and those of other cross-referenced ink jet configurations.
4. Etch the CMOS oxide layers down to silicon or aluminum using Mask 1. This mask defines the nozzle chamber, and the edges of the printheads chips. This step is shown in FIG. 6.
5. Crystallographically etch the exposed silicon using, for example, KOH or EDP (ethylenediamine pyrocatechol). This etch stops on <111> crystallographic planes 51, and on the boron doped silicon buried layer. This step is shown in FIG. 7.
6. Deposit 12 microns of sacrificial material 52. Planarize down to oxide using CMP. The sacrificial material 52 temporarily fills the nozzle cavity. This step is shown in FIG. 8.
7. Deposit 0.1 microns of high stress silicon nitride (Si3N4) 53.
8. Etch the nitride layer 53 using Mask 2. This mask defines the contact vias from the shape memory heater to the second-level metal contacts.
9. Deposit a seed layer.
10. Spin on 2 microns of resist, expose with Mask 3, and develop. This mask defines the shape memory wire embedded in the paddle. The resist acts as an electroplating mold. This step is shown in FIG. 9.
11. Electroplate 1 micron of Nitinol 55 on the sacrificial material 52 to fill the electroplating mold. Nitinol is a 'shape memory' alloy of nickel and titanium, developed at the Naval Ordnance Laboratory in the US (hence Ni—Ti—NOL). A shape memory alloy can be thermally switched between its weak martensitic state and its high stiffness austenitic state.
12. Strip the resist and etch the exposed seed layer. This step is shown in FIG. 10.
13. Wafer probe. All electrical connections are complete at this point, bond pads are accessible, and the chips are not yet separated.
14. Deposit 0.1 microns of high stress silicon nitride. High stress nitride is used so that once the sacrificial material is etched, and the paddle is released, the stress in the nitride layer will bend the relatively weak martensitic phase of the shape memory alloy. As the shape memory alloy, in its austenitic phase, is flat when it is annealed by the relatively high temperature deposition of this silicon nitride layer, it will return to this flat state when electrothermally heated.
15. Mount the wafer 50 on a glass blank 56 and back-etch the wafer using KOH with no mask. This etch thins the wafer and stops at the buried boron doped silicon layer. This step is shown in FIG. 11.
16. Plasma back-etch the boron doped silicon layer to a depth of 1 micron using Mask 4. This mask defines the nozzle rim 46. This step is shown in FIG. 12.
17. Plasma back-etch through the boron doped layer using Mask 5. This mask defines the nozzle port 47, and the edge of the chips. At this stage, the chips are still mounted on the glass blank 56. This step is shown in FIG. 13.
18. Strip the adhesive layer to detach the chips from the glass blank. Etch the sacrificial layer 52 away. This process completely separates the chips. This step is shown in FIG. 14.
19. Mount the printheads in their packaging, which may be a molded plastic former incorporating ink channels which supply different colors of ink to the appropriate regions of the front surface of the wafer.
20. Connect the printheads to their interconnect systems.
21. Hydrophobize the front surface of the printheads.
22. Fill with ink and test the completed printheads. A filled nozzle is shown in FIG. 15.

An embodiment of U.S. patent application Ser. No. 09/113,097 by the applicant is now described. This embodiment relies upon a magnetic actuator to "load" a spring, such that, upon deactivation of the magnetic actuator the resultant movement of the spring causes ejection of a drop of ink as the spring returns to its original position.

Figure 16:
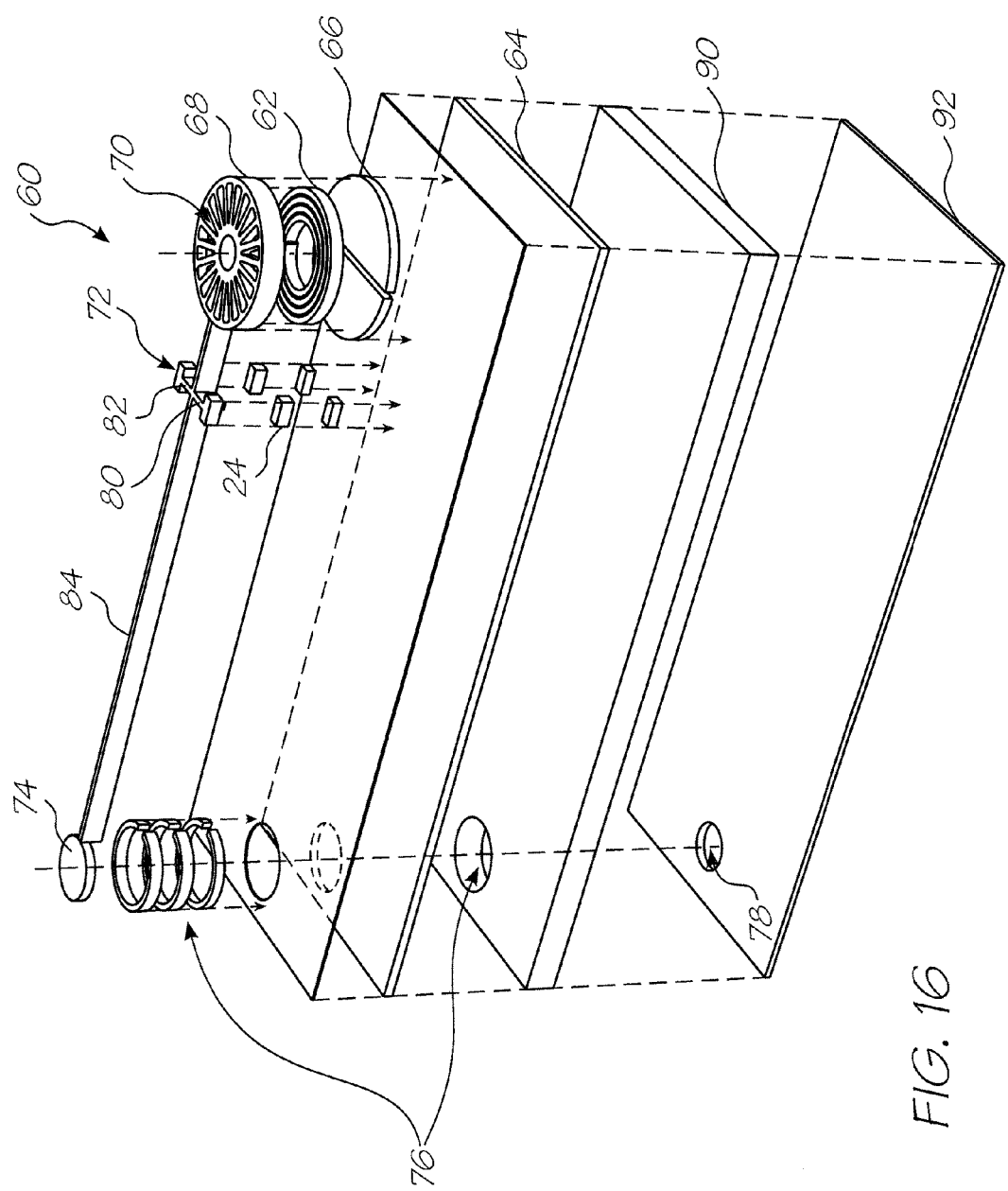
FIG. 16 is an exploded perspective view illustrating the construction of a single ink jet nozzle of U.S. patent application Ser. No. 09/113,097 by the Applicant, referred to in the table of cross-referenced material as set out above.

In FIG. 16, there is illustrated an exploded perspective view of an ink nozzle arrangement 60 constructed in accordance with the preferred embodiment. It would be understood that the preferred embodiment can be constructed as an array of nozzle arrangements 60 so as to together form an array for printing.

The operation of the ink nozzle arrangement 60 of FIG. 16 proceeds by a solenoid 62 being energized by way of a driving circuit 64 when it is desired to print out an ink drop. The energized solenoid 62 induces a magnetic field in a fixed soft magnetic pole 66 and a moveable soft magnetic pole 68. The solenoid power is turned on to a maximum current for long enough to move the moveable pole 68 from its rest position to a stopped position close to the fixed magnetic pole 66. The ink nozzle arrangement 60 of FIG. 1 sits within an ink chamber filled with ink. Therefore, holes 70 are provided in the moveable soft magnetic pole 68 for "squirting" out of ink from around the solenoid 62 when the pole 66 undergoes movement.

A fulcrum 72 with a piston head 74 balances the moveable soft magnetic pole 66. Movement of the magnetic pole 66 closer to the fixed pole 66 causes the piston head 74 to move away from a nozzle chamber 76 drawing air into the chamber 76 via an ink ejection port 78. The piston head 74 is then held open above the nozzle chamber 76 by means of maintaining a low "keeper" current through the solenoid 62. The keeper level current through solenoid 62 is sufficient to maintain the moveable pole 68 against the fixed soft magnetic pole 66. The level of current will be substantially less than the maximum current level because a gap 114 (FIG. 35) between the two poles 66 and 68 is at a minimum. For example, a keeper level current of 10% of the maximum current level may be suitable. During this phase of operation, the meniscus of ink at the nozzle tip or ink ejection port 78 is a concave hemisphere due to the inflow of air. The surface tension on the meniscus exerts a net force on the ink which results in ink flow from an ink chamber into the nozzle chamber 76. This results in the nozzle chamber 76 refilling, replacing the volume taken up by the piston head 74 which has been withdrawn. This process takes approximately 100 μs.

The current within solenoid 62 is then reversed to half that of the maximum current. The reversal demagnetises the magnetic poles 66, 68 and initiates a return of the piston 74 to its rest position. The piston 74 is moved to its normal rest position by both magnetic repulsion and by energy stored in a stressed torsional spring 80, 82 which was put in a state of torsion upon the movement of moveable pole 68.

The forces applied to the piston 74 as a result of the reverse current and spring 80, 82 is greatest at the beginning of the movement of the piston 74 and decreases as the spring elastic stress falls to zero. As a result, the acceleration of piston 74 is high at the beginning of a reverse stroke and the resultant ink velocity within the nozzle chamber 76 becomes uniform during the stroke. This results in an increased operating tolerance before ink flow over the printhead surface occurs.

At a predetermined time during the return stroke, the solenoid reverse current is turned off. The current is turned off when the residual magnetism of the movable pole is at a minimum. The piston 74 continues to move towards its original rest position.

The piston 74 overshoots the quiescent or rest position due to its inertia. Overshoot in the piston movement achieves two things: greater ejected drop volume and velocity, and improved drop break off as the piston 74 returns from overshoot to its quiescent position.

The piston 74 eventually returns from overshoot to the quiescent position. This return is caused by the springs 80, 82 which are now stressed in the opposite direction. The piston return "sucks" some of the ink back into the nozzle chamber 76, causing the ink ligament connecting the ink drop to the ink in the nozzle chamber 76 to thin. The forward velocity of the drop and the backward velocity of the ink in the nozzle chamber 76 are resolved by the ink drop breaking off from the ink in the nozzle chamber 76.

The piston 74 stays in the quiescent position until the next drop ejection cycle.

A liquid ink printhead has one ink nozzle arrangement 60 associated with each of the multitude of nozzles. The arrangement 60 has the following major parts:

(1) Drive circuitry 64 for driving the solenoid 62.

(2) The ejection port 78. The radius of the ejection port 78 is an important determinant of drop velocity and drop size.

(3) The piston 74. This is a cylinder which moves through the nozzle chamber 76 to expel the ink. The piston 74 is connected to one end of a lever arm 84. The piston radius is approximately 1.5 to 2 times the radius of the ejection port 78. The volume of ink displaced by the piston 74 during the piston return stroke mostly determines the ink drop volume output.

(4) The nozzle chamber 76. The nozzle chamber 76 is slightly wider than the piston 74. The gap 114 (FIGS. 34 & 35) between the piston 74 and the nozzle chamber walls is as small as is required to ensure that the piston does not make contact with the nozzle chamber 76 during actuation or return. If the printheads are fabricated using 0.5 μm semiconductor lithography, then a 1 μm gap 114 will usually be sufficient. The nozzle chamber 76 is also deep enough so that air ingested through the ejection port 78 when the piston 74 returns to its quiescent state does not extend to the piston 74. If it does, the ingested bubble may form a cylindrical surface instead of a hemispherical surface. If this happens, the nozzle will not refill properly.

(5) The solenoid 62. This is a spiral coil of copper. Copper is used for its low resistivity and high electro-migration resistance.

(6) The fixed magnetic pole 66 of ferromagnetic material.

(7) The moveable magnetic pole 68 of ferromagnetic material. To maximise the magnetic force generated, the moveable magnetic pole 68 and fixed magnetic pole 66 surround the solenoid 62 to define a torus. Thus, little magnetic flux is lost, and the flux is concentrated across the gap between the moveable magnetic pole 68 and the fixed pole 66. The moveable magnetic pole 68 has the holes 70 above the solenoid 62 to allow trapped ink to escape. These holes 70 are arranged and shaped so as to minimise their effect on the magnetic force generated between the moveable magnetic pole 68 and the fixed magnetic pole 66.

(8) The magnetic gap 114. The gap 114 between the fixed pole 66 and the moveable pole 68 is one of the most important "parts" of the print actuator. The size of the gap 114 strongly affects the magnetic force generated, and also limits the travel of the moveable magnetic pole 68. A small gap is desirable to achieve a strong magnetic force. The travel of the piston 74 is related to the travel of the moveable magnetic pole 68 (and therefore the gap 114) by the lever arm 84.

(9) Length of the lever arm 84. The lever arm 84 allows the travel of the piston 74 and the moveable magnetic pole 68 to be independently optimised. At the short end of the lever arm 84 is the moveable magnetic pole 68. At the long end of the lever arm 84 is the piston 74. The spring 80, 82 is at the fulcrum 72. The optimum travel for the moveable magnetic pole 68 is less than 1 mm, so as to minimise the magnetic gap. The optimum travel for the piston 74 is approximately 5 μm for a 1200 dpi printer. A lever 84 resolves the difference in optimum travel with a 5:1 or greater ratio in arm length.

(10) The springs 80, 82 (FIG. 1). The springs 80, 82 return the piston 74 to its quiescent position after a deactivation of the solenoid 62. The springs 80, 82 are at the fulcrum 72 of the lever arm 84.

(11) Passivation layers (not shown). All surfaces are preferably coated with passivation layers, which may be silicon nitride ($Si_3N_4$), diamond like carbon (DLC), or other chemically inert, highly impermeable layer. The passivation layers are especially important for device lifetime, as the active device is immersed in the ink.

As will be evident from the foregoing description, there is an advantage in ejecting the drop on deactivation of the solenoid 62. This advantage comes from the rate of acceleration of the moving magnetic pole 68.

The force produced by the moveable magnetic pole 68 by an electromagnetically induced field is approximately proportional to the inverse square of the gap between the moveable and static magnetic poles 68, 66. When the solenoid 62 is off, this gap is at a maximum. When the solenoid 62 is turned on, the moveable pole 68 is attracted to the static pole 66. As the gap decreases, the force increases, accelerating the moveable pole 68 faster. The velocity increases in a highly non-linear fashion, approximately with the square of time. During the reverse movement of the moveable pole 68 upon deactivation, the acceleration of the moveable pole 68 is greatest at the beginning and then slows as the spring elastic stress falls to zero. As a result, the velocity of the moveable pole 68 is more uniform during the reverse stroke movement.

(1) The velocity of the piston or plunger 74 is constant over the duration of the drop ejection stroke.

(2) The piston or plunger 74 can be entirely removed from the ink chamber 76 during the ink fill stage, and thereby the nozzle filling time can be reduced, allowing faster printhead operation.

However, this approach does have some disadvantages over a direct firing type of actuator:

(1) The stresses on the spring 80, 82 are relatively large. Careful design is required to ensure that the springs operate at below the yield strength of the materials used.

(2) The solenoid 62 must be provided with a "keeper" current for the nozzle fill duration. The keeper current will typically be less than 10% of the solenoid actuation current.

However, the nozzle fill duration is typically around 50 times the drop firing duration, so the keeper energy will typically exceed the solenoid actuation energy.

(3) The operation of the actuator is more complex due to the requirement for a "keeper" phase.

The printhead is fabricated from two silicon wafers. A first wafer is used to fabricate the print nozzles (the printhead wafer) and a second wafer (the Ink Channel Wafer) is utilised to fabricate the various ink channels in addition to providing a support means for the first channel. The fabrication process then proceeds as follows:

(1) Start with a single crystal silicon wafer 90, which has a buried epitaxial layer 92 of silicon which is heavily doped with boron. The boron should be doped to preferably $10^{20}$ atoms per cm$^3$ of boron or more, and be approximately 3 μm thick, and be doped in a manner suitable for the active semiconductor device technology chosen. The wafer diameter of the printhead wafer should be the same as the ink channel wafer.

(2) Fabricate the drive transistors and data distribution circuitry 64 according to the process chosen (eg. CMOS).

(3) Planarize the wafer 90 using chemical mechanical planarization (CMP).

(4) Deposit 5 mm of glass (SiO$_2$) over the second level metal.

(5) Using a dual damascene process, etch two levels into the top oxide layer. Level 1 is 4 μm deep, and level 2 is 5 μm deep. Level 2 contacts the second level metal. The masks for the static magnetic pole are used.

(6) Deposit 5 μm of nickel iron alloy (NiFe).

(7) Planarize the wafer using CMP, until the level of the SiO$_2$ is reached forming the magnetic pole 66.

(8) Deposit 0.1 μm of silicon nitride (Si$_3$N$_4$).

(9) Etch the Si$_3$N$_4$ for via holes for the connections to the solenoids, and for the nozzle chamber region 76.

(10) Deposit 4 μm of SiO$_2$.

(11) Plasma etch the SiO$_2$ in using the solenoid and support post mask.

(12) Deposit a thin diffusion barrier, such as Ti, TiN, or TiW, and an adhesion layer if the diffusion layer chosen has insufficient adhesion.

(13) Deposit 4 μm of copper for forming the solenoid 62 and spring posts 94. The deposition may be by sputtering, CVD, or electroless plating. As well as lower resistivity than aluminium, copper has significantly higher resistance to electro-migration. The electro-migration resistance is significant, as current densities in the order of $3 \times 10^6$ Amps/cm$^2$ may be required. Copper films deposited by low energy kinetic ion bias sputtering have been found to have 1,000 to 100,000 times larger electro-migration lifetimes larger than aluminium silicon alloy. The deposited copper should be alloyed and layered for maximum electro-migration lifetimes than aluminium silicon alloy. The deposited copper should be alloyed and layered for maximum electro-migration resistance, while maintaining high electrical conductivity.

(14) Planarize the wafer using CMP, until the level of the SiO$_2$ is reached. A damascene process is used for the copper layer due to the difficulty involved in etching copper. However, since the damascene dielectric layer is subsequently removed, processing is actually simpler if a standard deposit/ etch cycle is used instead of damascene. However, it should be noted that the aspect ratio of the copper etch would be 8:1 for this design, compared to only 4:1 for a damascene oxide etch. This difference occurs because the copper is 1 μm wide and 4 μm thick, but has only 0.5 μm spacing. Damascene processing also reduces the lithographic difficultly, as the resist is on oxide, not metal.

(15) Plasma etch the nozzle chamber 76, stopping at the boron doped epitaxial silicon layer 92. This etch will be through around 13 μm of SiO$_2$, and 8 μm of silicon. The etch should be highly anisotropic, with near vertical sidewalls. The etch stop detection can be on boron in the exhaust gasses. If this etch is selective against NiFe, the masks for this step and the following step can be combined, and the following step can be eliminated. This step also etches the edge of the printhead wafer down to the boron layer, for later separation.

(16) Etch the SiO$_2$ layer. This need only be removed in the regions above the NiFe fixed magnetic poles, so it can be removed in the previous step if an Si and SiO$_2$ etch selective against NiFe is used.

(17) Conformably deposit 0.5 μm of high density Si$_3$N$_4$. This forms a corrosion barrier, so should be free of pinholes, and be impermeable to OH ions.

(18) Deposit a thick sacrificial layer. This layer should entirely fill the nozzle chambers, and coat the entire wafer to an added thickness of 8 μm. The sacrificial layer may be SiO$_2$.

(19) Etch two depths in the sacrificial layer for a dual damascene process. The deep etch is 8 μm, and the shallow etch is 3 μm. The masks define the piston 74, the lever arm 84, the springs 80, 82 and the moveable magnetic pole 68.

(20) Conformably deposit 0.1 μm of high density Si$_3$N$_4$. This forms a corrosion barrier, so should be free of pinholes, and be impermeable to OH ions.

(21) Deposit 8 μm of nickel iron alloy (NiFe).

(22) Planarize the wafer using CMP, until the level of the SiO$_2$ is reached.

(23) Deposit 0.1 μm of silicon nitride (Si$_3$N$_4$).

(24) Etch the Si$_3$N$_4$ everywhere except the top of the plungers.

(25) Open the bond pads.

(26) Permanently bond the wafer onto a pre-fabricated ink channel wafer. The active side of the printhead wafer faces the ink channel wafer. The ink channel wafer is attached to a backing plate, as it has already been etched into separate ink channel chips.

(27) Etch the printhead wafer to entirely remove the backside silicon to the level of the boron doped epitaxial layer 92. This etch can be a batch wet etch in ethylenediamine pyrocatechol (EDP).

(28) Mask a nozzle rim 96 from the underside of the printhead wafer. This mask also includes the chip edges.

(31) Etch through the boron doped silicon layer 92, thereby creating the nozzle holes 70. This etch should also etch fairly deeply into the sacrificial material in the nozzle chambers 76 to reduce time required to remove the sacrificial layer.

(32) Completely etch the sacrificial material. If this material is SiO$_2$ then a HF etch can be used. The nitride coating on the various layers protects the other glass dielectric layers and other materials in the device from HF etching. Access of the HF to the sacrificial layer material is through the nozzle, and simultaneously through the ink channel chip. The effective depth of the etch is 21 μm.

(33) Separate the chips from the backing plate. Each chip is now a full printhead including ink channels. The two wafers have already been etched through, so the printheads do not need to be diced.

(34) Test the printheads and TAB bond the good printheads.

(35) Hydrophobize the front surface of the printheads.

(36) Perform final testing on the TAB bonded printheads.

Figure 17:
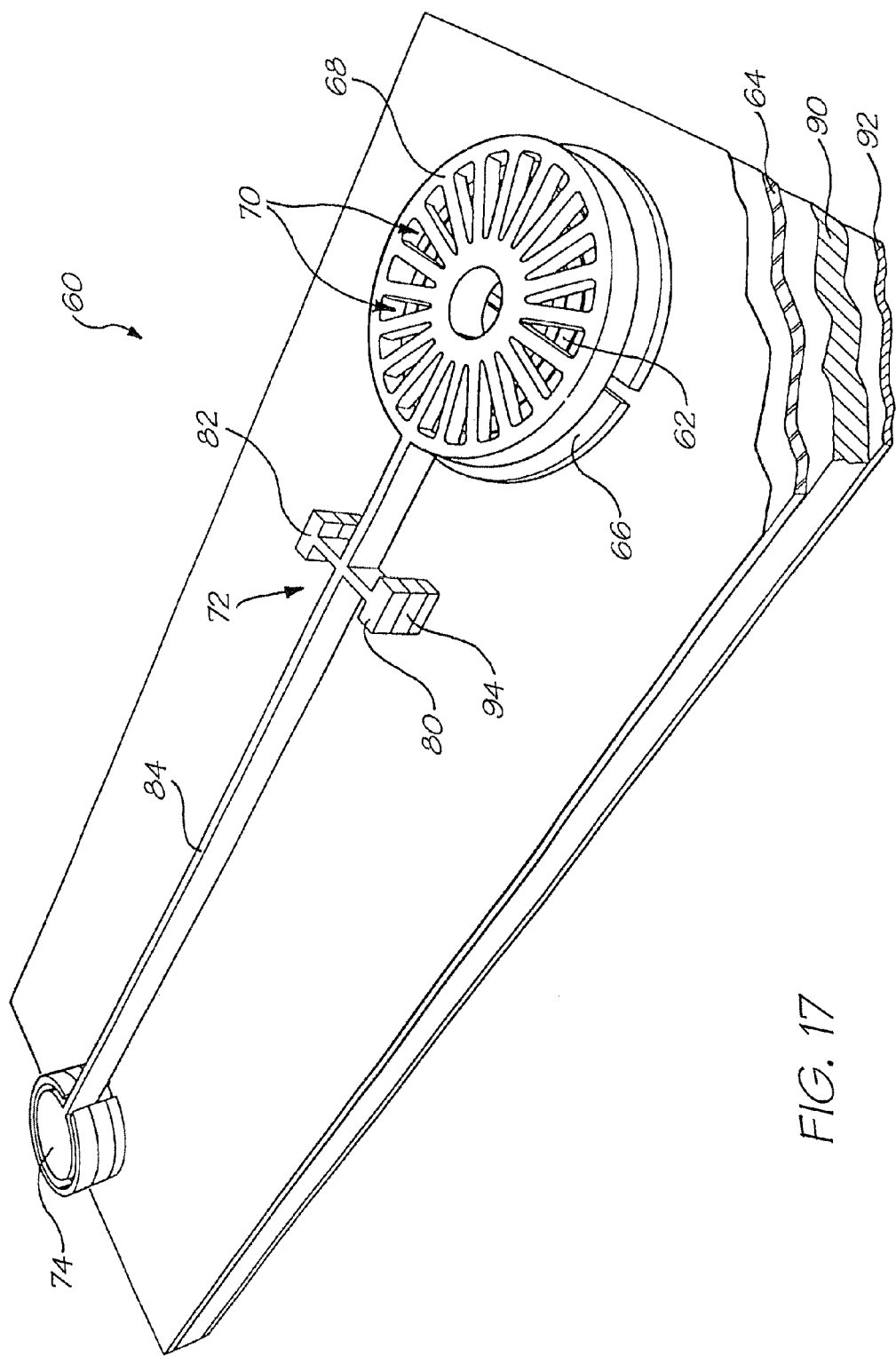
FIG. 17 is a perspective view, in part in section, of the ink jet nozzle of FIG. 16.

FIG. 17 shows a perspective view, in part in section, of a single ink jet nozzle arrangement 60 constructed in accordance with the preferred embodiment.

One alternative form of detailed manufacturing process which can be used to fabricate monolithic ink jet printheads operating in accordance with the principles taught by the present embodiment can proceed utilizing the following steps:

1. Using a double-sided polished wafer 90 deposit 3 microns of epitaxial silicon 92 heavily doped with boron.

2. Deposit 10 microns of epitaxial silicon 98, either p-type or n-type, depending upon the CMOS process used.

Figure 18:
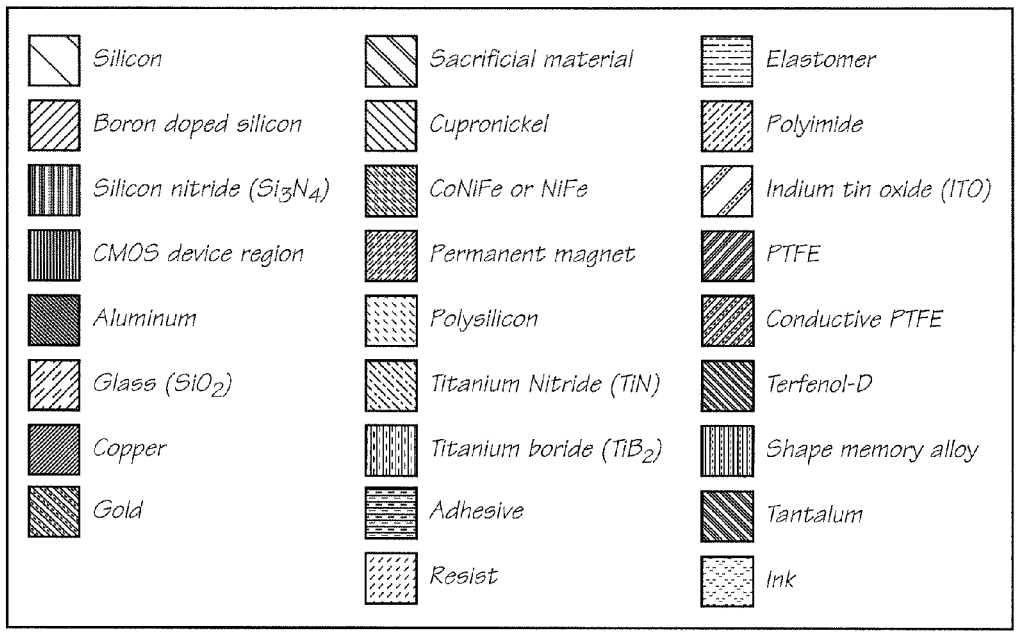
FIG. 18 provides a legend of the materials indicated in FIGS. 19 to 35.
Figure 19:
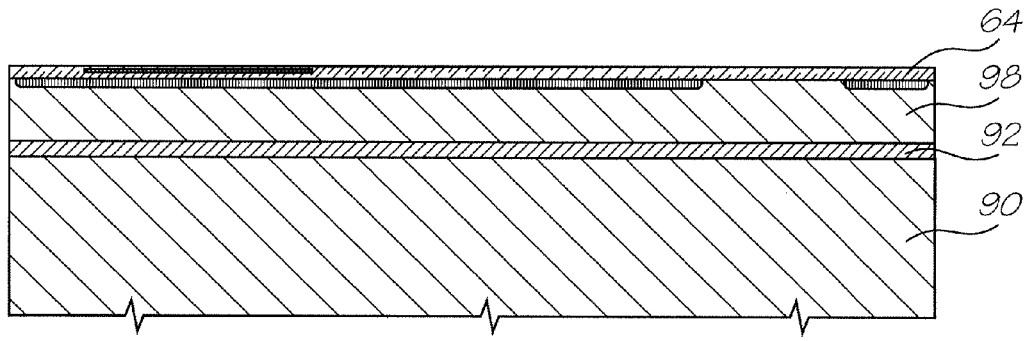
FIGS. 19 to 35 illustrate sectional views of the manufacturing steps in one form of construction of the ink jet printhead nozzle of FIG. 16.

3. Complete a 0.5-micron, one poly, 2 metal CMOS process. This step is shown in FIG. 19. For clarity, these diagrams may not be to scale, and may not represent a cross section though any single plane of the nozzle. FIG. 18 is a key to representations of various materials in these manufacturing diagrams.

4. Etch the CMOS oxide layers down to silicon or aluminum using Mask 1. This mask defines the nozzle chamber 76, the edges of the printheads chips, and the vias for the contacts from the aluminum electrodes to two halves of the fixed magnetic pole 66.

Figure 20:
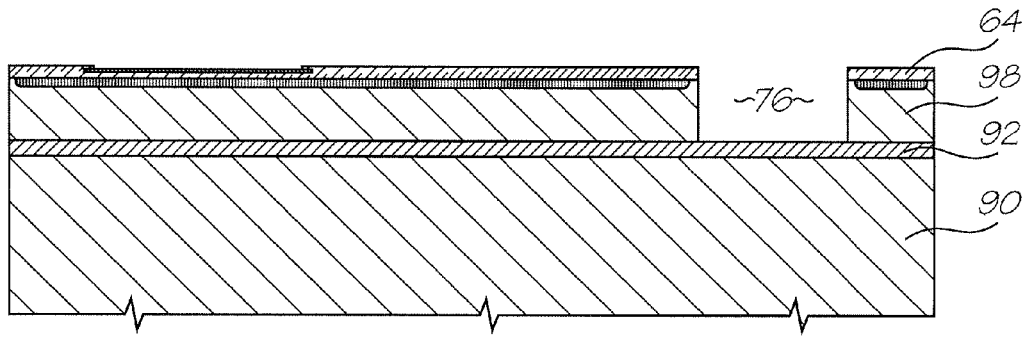

5. Plasma etch the silicon 90 down to the boron doped buried layer 92, using oxide from step 4 as a mask. This etch does not substantially etch the aluminum. This step is shown in FIG. 20.

6. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 21:
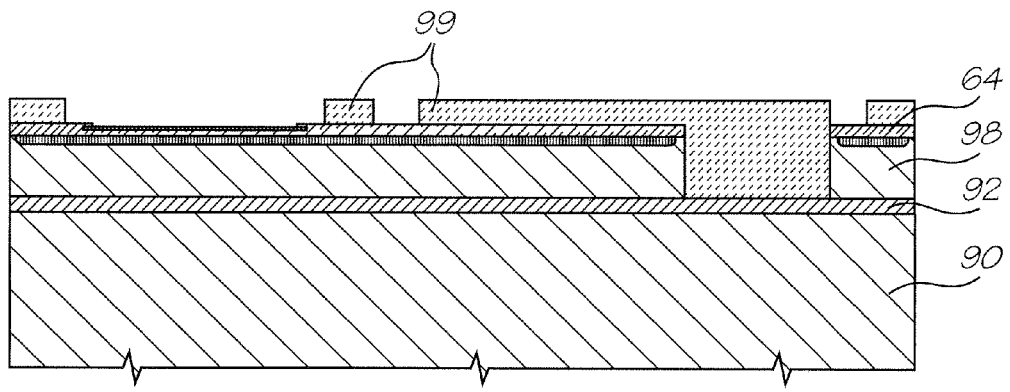

7. Spin on 4 microns of resist 99, expose with Mask 2, and develop. This mask defines the fixed magnetic pole 66 and the nozzle chamber wall, for which the resist 99 acts as an electroplating mold. This step is shown in FIG. 21.

Figure 22:
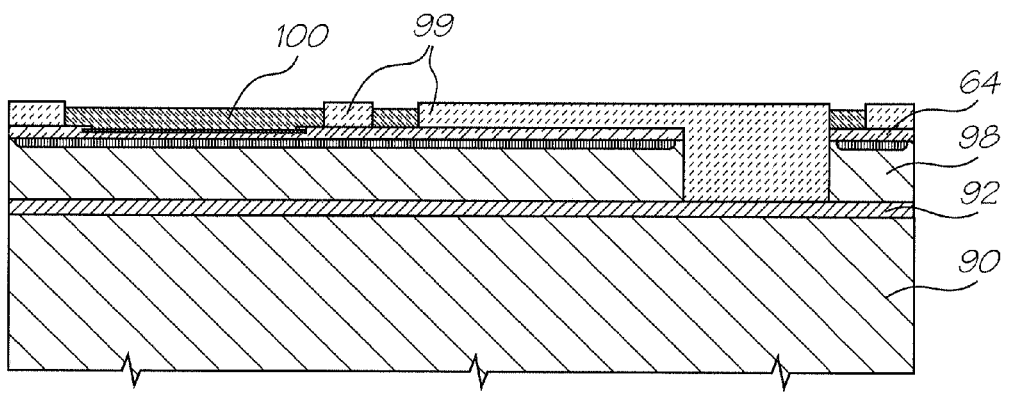

8. Electroplate 3 microns of CoNiFe 100. This step is shown in FIG. 22.

Figure 23:
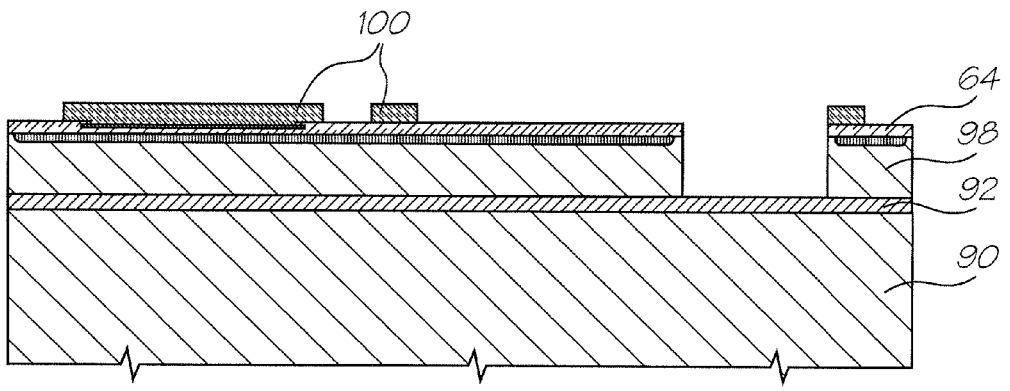

9. Strip the resist and etch the exposed seed layer. This step is shown in FIG. 23.

10. Deposit 0.1 microns of silicon nitride (Si3N4).

11. Etch the nitride layer using Mask 3. This mask defines the contact vias from each end of the solenoid 62 to the two halves of the fixed magnetic pole 66.

12. Deposit a seed layer of copper. Copper is used for its low resistivity (which results in higher efficiency) and its high electromigration resistance, which increases reliability at high current densities.

Figure 24:
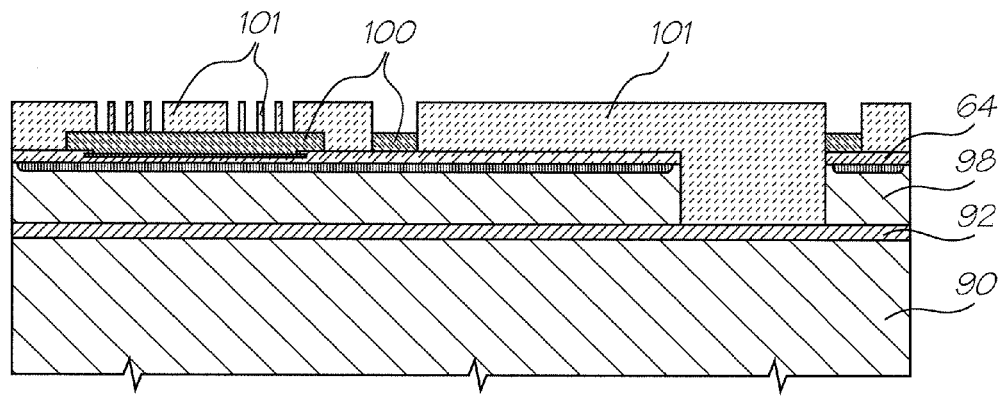

13. Spin on 5 microns of resist 101, expose with Mask 4, and develop. This mask defines a spiral coil for the solenoid 62, the nozzle chamber wall and the spring posts 94, for which the resist acts as an electroplating mold. This step is shown in FIG. 24.

14. Electroplate 4 microns of copper 103.

Figure 25:
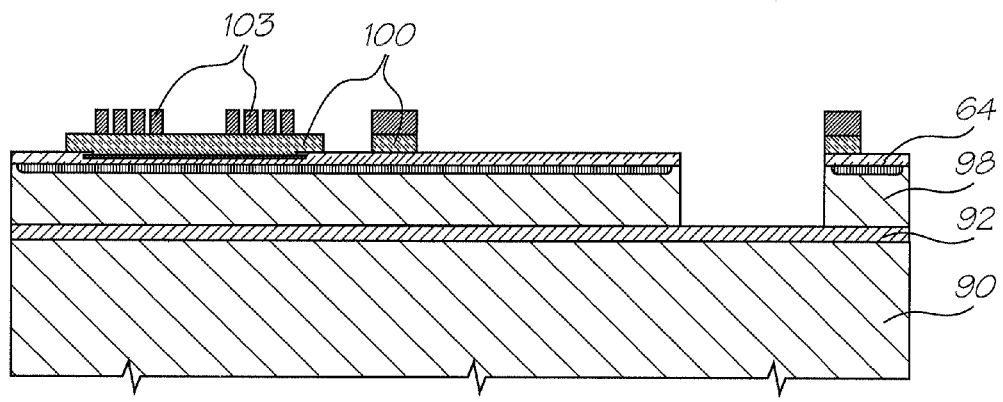

15. Strip the resist 101 and etch the exposed copper seed layer. This step is shown in FIG. 25.

16. Wafer probe. All electrical connections are complete at this point, bond pads are accessible, and the chips are not yet separated.

17. Deposit 0.1 microns of silicon nitride.

18. Deposit 1 micron of sacrificial material 102. This layer determines the magnetic gap 114.

Figure 26:
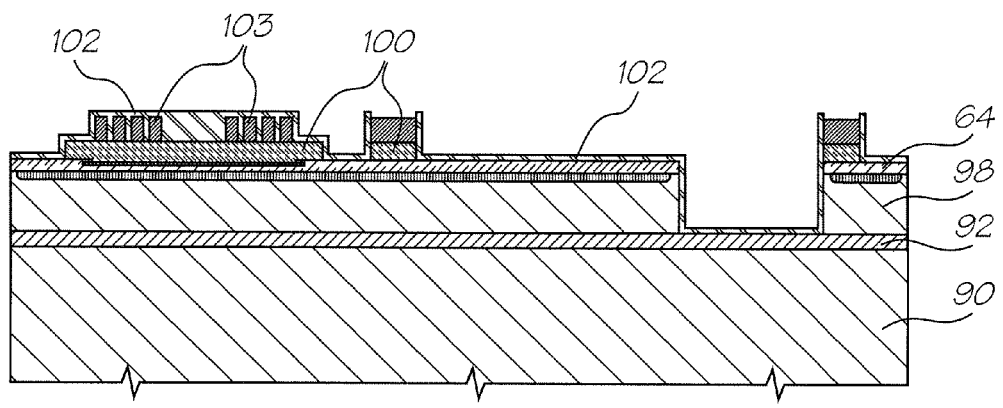

19. Etch the sacrificial material 102 using Mask 5. This mask defines the spring posts 94 and the nozzle chamber wall. This step is shown in FIG. 26.

20. Deposit a seed layer of CoNiFe.

Figure 27:
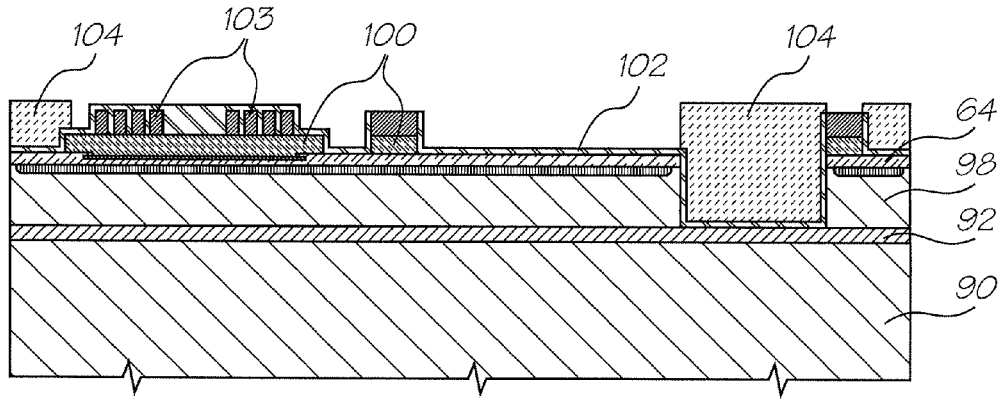
Figure 28:
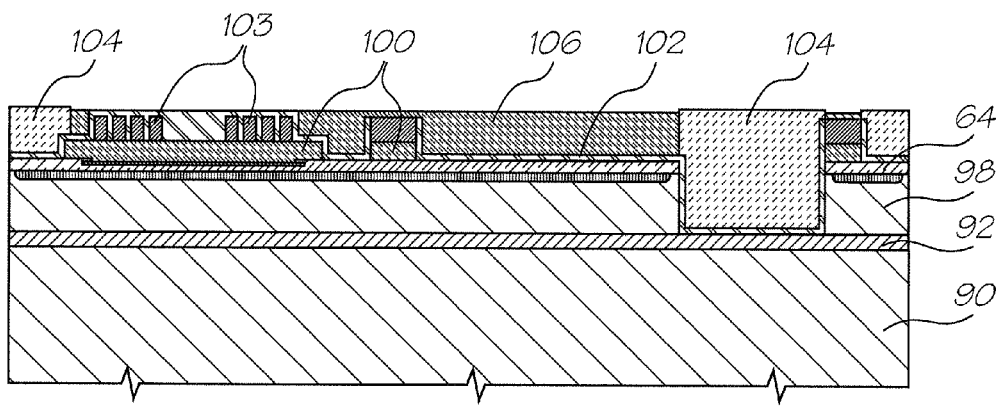

21. Spin on 4.5 microns of resist 104, expose with Mask 6, and develop. This mask defines the walls of the magnetic plunger or piston 74, the lever arm 84, the nozzle chamber wall and the spring posts 94. The resist forms an electroplating mold for these parts. This step is shown in FIG. 27.

22. Electroplate 4 microns of CoNiFe 106. This step is shown in FIG. 13.

23. Deposit a seed layer of CoNiFe.

Figure 29:
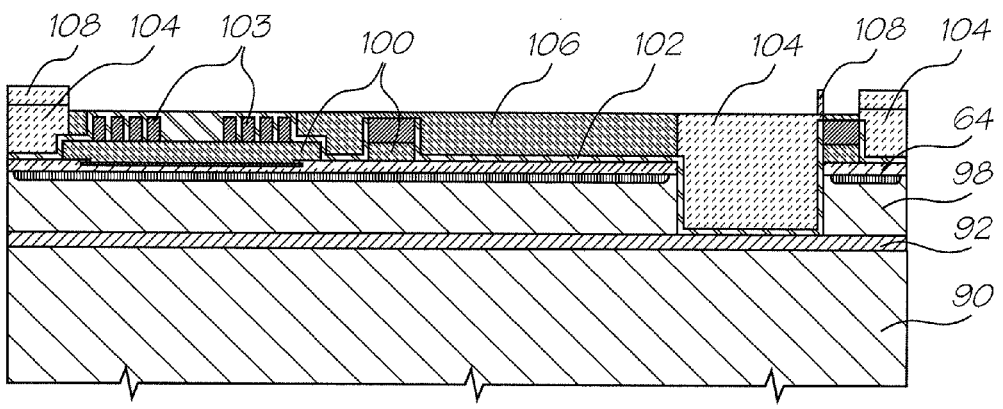

24. Spin on 4 microns of resist 108, expose with Mask 7, and develop. This mask defines the roof of the magnetic plunger 74, the nozzle chamber wall, the lever arm 84, the springs 80, 82, and the spring posts 94. The resist 108 forms an electroplating mold for these parts. This step is shown in FIG. 29.

Figure 30:
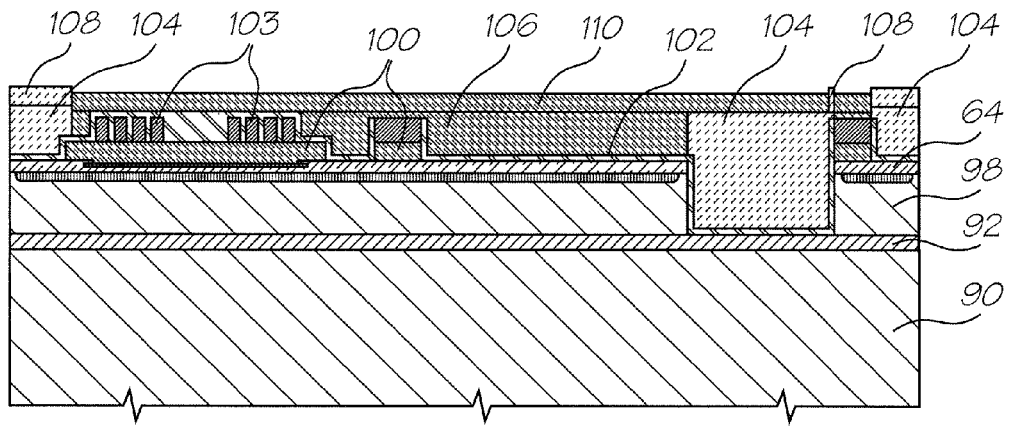

25. Electroplate 3 microns of CoNiFe 110. This step is shown in FIG. 30.

Figure 31:
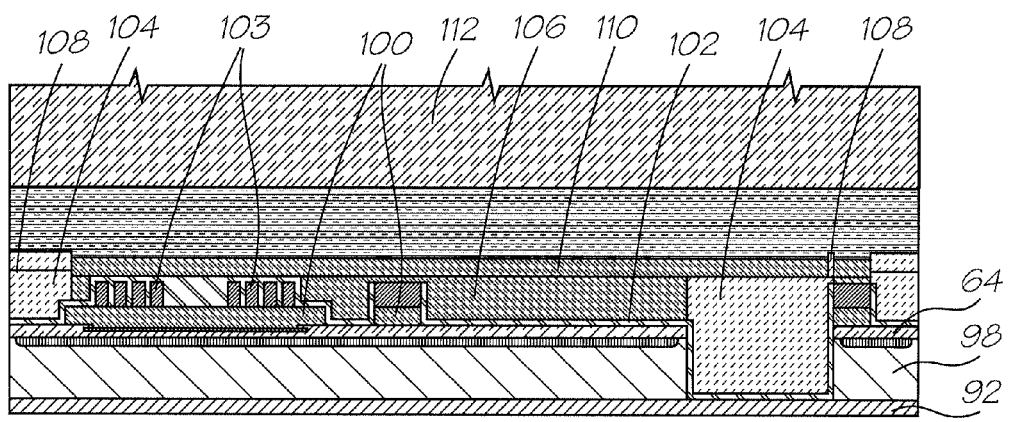

26. Mount the wafer 90 on a glass blank 112 and back-etch the wafer 90 using KOH, with no mask. This etch thins the wafer 90 and stops at the buried boron doped silicon layer 92. This step is shown in FIG. 31.

Figure 32:
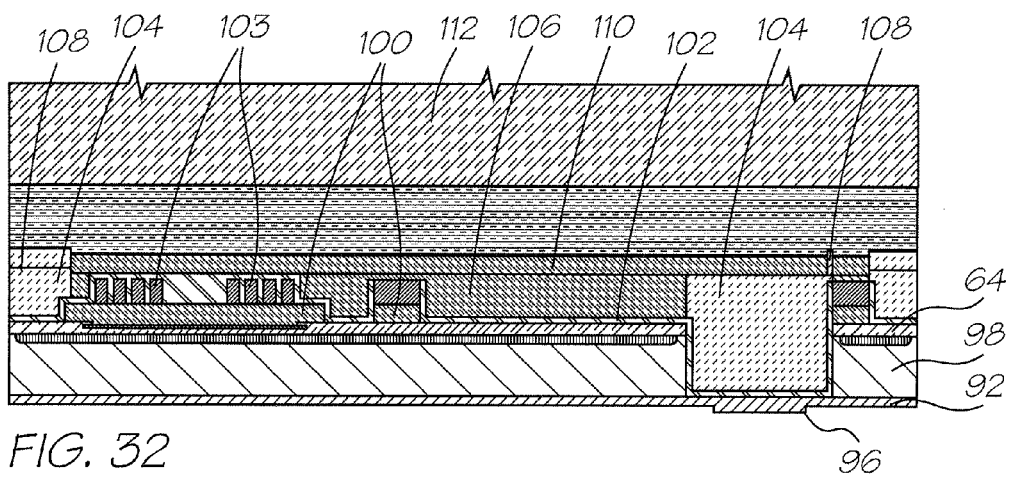

27. Plasma back-etch the boron doped silicon layer 92 to a depth of 1 micron using Mask 8. This mask defines the nozzle rim 96. This step is shown in FIG. 32.

Figure 33:
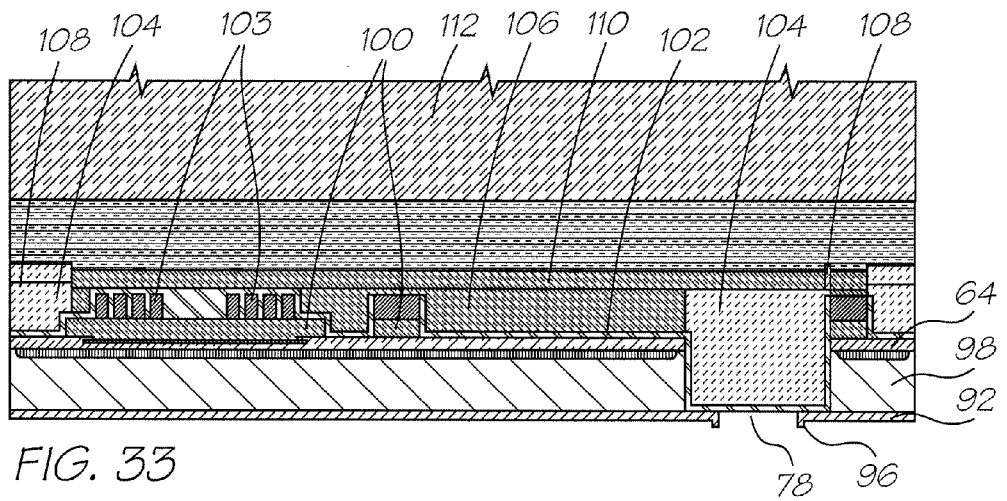

28. Plasma back-etch through the boron doped layer 92 using Mask 9. This mask defines the ink ejection port 78, and the edge of the chips. At this stage, the chips are separate, but are still mounted on the glass blank 112. This step is shown in FIG. 33.

Figure 34:
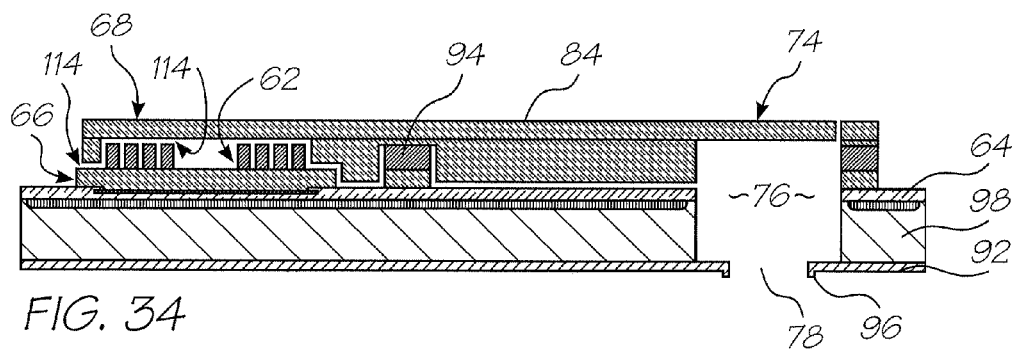

29. Detach the chips from the glass blank 112. Strip all adhesive, resist, sacrificial, and exposed seed layers. This step is shown in FIG. 34.

30. Mount the printheads in their packaging, which may be a molded plastic former incorporating ink channels which supply different colors of ink to the appropriate regions of the front surface of the wafer.

31. Connect the printheads to their interconnect systems.

32. Hydrophobize the front surface of the printheads.

Figure 35:
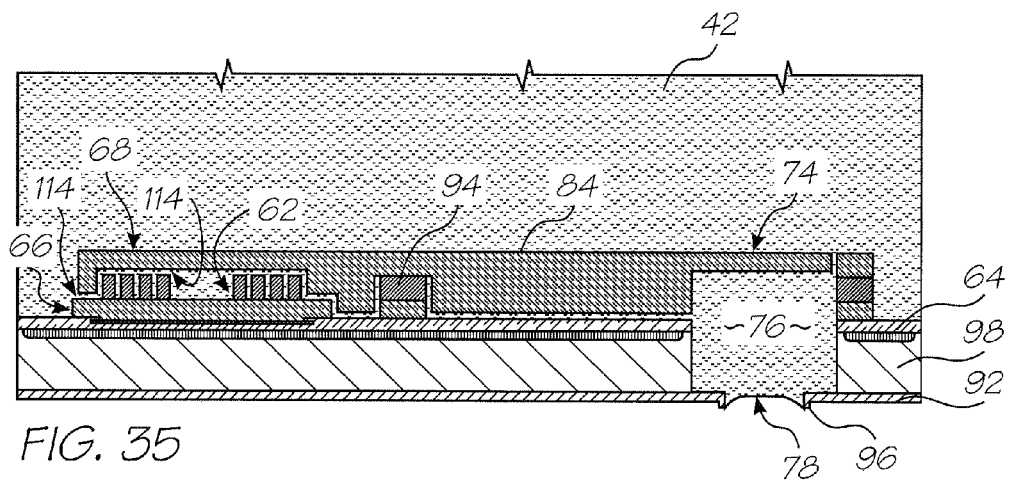

33. Fill the completed printheads with ink and test them. A filled nozzle is shown in FIG. 35.

The following description is of an embodiment of the invention covered by U.S. patent application Ser. No. 09/113,061 to the applicant. In this embodiment, a linear stepper motor is utilised to control a plunger device. The plunger device compresses ink within a nozzle chamber to cause the ejection of ink from the chamber on demand.

Figure 36:
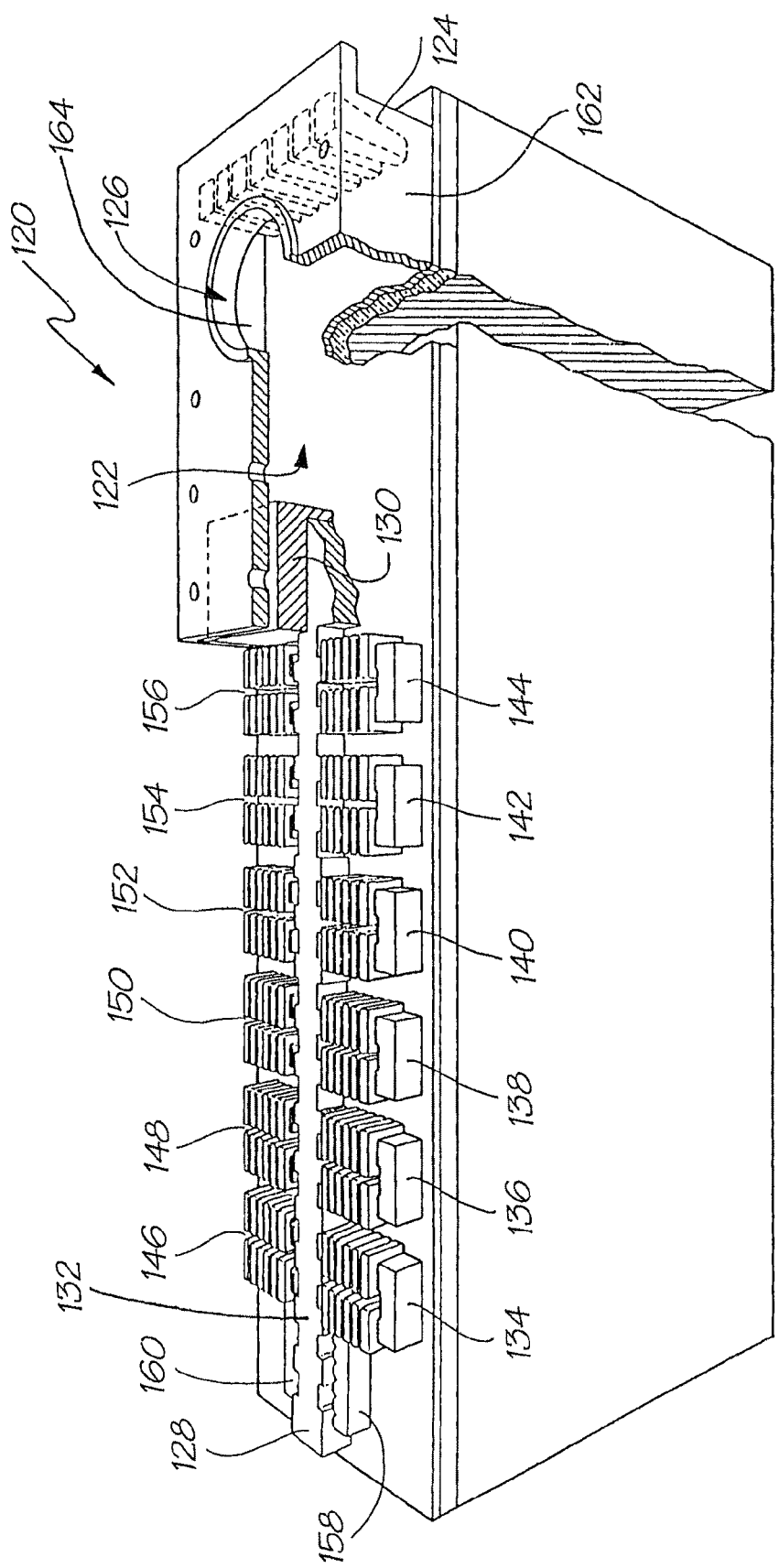
FIG. 36 is a cut-out top view of an ink jet nozzle of U.S. patent application Ser. No. 09/113,061 by the Applicant, referred to in the table of cross-referenced material as set out above.

Turning to FIG. 36, there is illustrated a single nozzle arrangement 120 as constructed in accordance with this embodiment. The nozzle arrangement 120 includes a nozzle chamber 122 into which ink flows via a nozzle chamber filter portion 124 which includes a series of posts which filter out foreign bodies in the ink inflow. The nozzle chamber 122 includes an ink ejection port 126 for the ejection of ink on demand. Normally, the nozzle chamber 122 is filled with ink.

A linear actuator 128 is provided for rapidly compressing a nickel ferrous plunger 130 into the nozzle chamber 122 so as to compress the volume of ink within the chamber 122 to thereby cause ejection of drops from the ink ejection port 126. The plunger 130 is connected to a stepper moving pole device 132 of the linear actuator 128 which is actuated by means of a three phase arrangement of electromagnets 134, 136, 138, 140, 142, 144, 146, 148, 150, 152, 154, 156. The electromagnets are driven in three phases with electro magnets 134, 146, 140 and 152 being driven in a first phase, electromagnets 136, 148, 142, 154 being driven in a second phase and electromagnets 138, 150, 144, 156 being driven in a third phase. The electromagnets are driven in a reversible manner so as to de-actuate the plunger 130 via actuator 128. The actuator 128 is guided at one end by a means of a guide 158, 160. At the other end, the plunger 130 is coated with a hydrophobic material such as polytetrafluoroethylene (PTFE) which can form a major part of the plunger 130. The PTFE acts to repel the ink from the nozzle chamber 122 resulting in the creation of menisci 224, 226 (FIG. 59(*a*)) between the plunger 130 and side walls 162, 164. The surface tension characteristics of the menisci 224, 226 act to guide the plunger 130 within the nozzle chamber 122. The menisci 224, 226 further stop ink from flowing out of the chamber 122 and hence the electromagnets 134 to 156 can be operated in the atmosphere.

The nozzle arrangement 120 is therefore operated to eject drops on demand by means of activating the actuator 128 by appropriately synchronised driving of electromagnets 134 to 156. The actuation of the actuator 128 results in the plunger 130 moving towards the nozzle ink ejection port 126 thereby causing ink to be ejected from the port 126.

Subsequently, the electromagnets 134 to 156 are driven in reverse thereby moving the plunger 130 in an opposite direction resulting in the inflow of ink from an ink supply connected to an ink inlet port 166.

Preferably, multiple ink nozzle arrangements 120 can be constructed adjacent to one another to form a multiple nozzle ink ejection mechanism. The nozzle arrangements 120 are preferably constructed in an array print head constructed on a single silicon wafer which is subsequently diced in accordance with requirements. The diced print heads can then be interconnected to an ink supply which can comprise a through chip ink flow or ink flow from the side of a chip.

Figure 37:
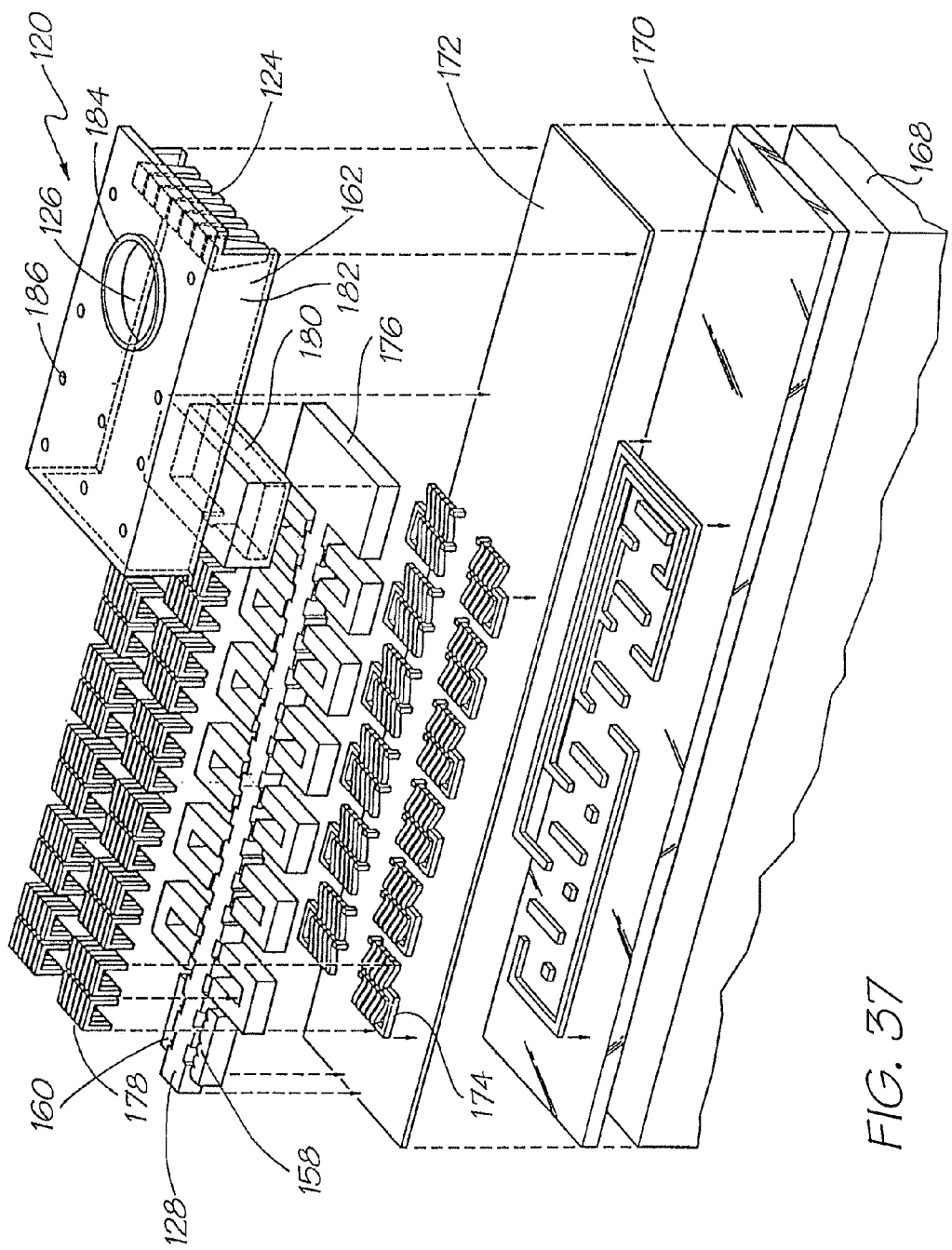
FIG. 37 is an exploded perspective view illustrating the construction of the ink jet nozzle of FIG. 36.

Turning now to FIG. 37, there is shown an exploded perspective of the various layers of the nozzle arrangement 120. The nozzle arrangement 120 can be constructed on top of a silicon wafer 168 which has a standard electronic circuitry layer such as a two level metal CMOS layer 170. The two metal CMOS layer 170 provides the drive and control circuitry for the ejection of ink from the nozzles 120 by interconnection of the electromagnets to the CMOS layer 170. On top of the CMOS layer 170 is a nitride passivation layer 172 which passivates the lower layers against any ink erosion in addition to any etching of the lower CMOS glass layer 170 should a sacrificial etching process be used in the construction of the nozzle arrangement 120.

On top of the nitride layer 172 are constructed various other layers. The wafer layer 168, the CMOS layer 170 and the nitride passivation layer 172 are constructed with the appropriate vias for interconnection with the above layers. On top of the nitride layer 172 is constructed a bottom copper layer 174 which interconnects with the CMOS layer 170 as appropriate. Next, a nickel ferrous layer 176 is constructed which includes portions for the core of the electromagnets 134 to 156 and the actuator 128 and guides 158, 160. On top of the NiFe layer 176 is constructed a second copper layer 178 which forms the rest of the electromagnetic device. The copper layer 178 can be constructed using a dual damascene process. Next, a PTFE layer 180 is laid down followed by a nitride layer 182 which defines the side filter portions 124 and side wall portions 162, 164 of the nozzle chamber 122. The ejection port 126 and a nozzle rim 184 are etched into the nitride layer 182. A number of apertures 186 are defined in the nitride layer 182 to facilitate etching away any sacrificial material used in the construction of the various lower layers including the nitride layer 182.

It will be understood by those skilled in the art of construction of micro-electro-mechanical systems (MEMS) that the various layers 170 to 182 can be constructed using a sacrificial material to support the layers. The sacrificial material is then etched away to release the components of the nozzle arrangement 120.

For a general introduction to a micro-electro mechanical system (MEMS) reference is made to standard proceedings in this field including the proceedings of the SPIE (International Society for Optical Engineering), volumes 2642 and 2882 which contain the proceedings for recent advances and conferences in this field.

Figure 38:
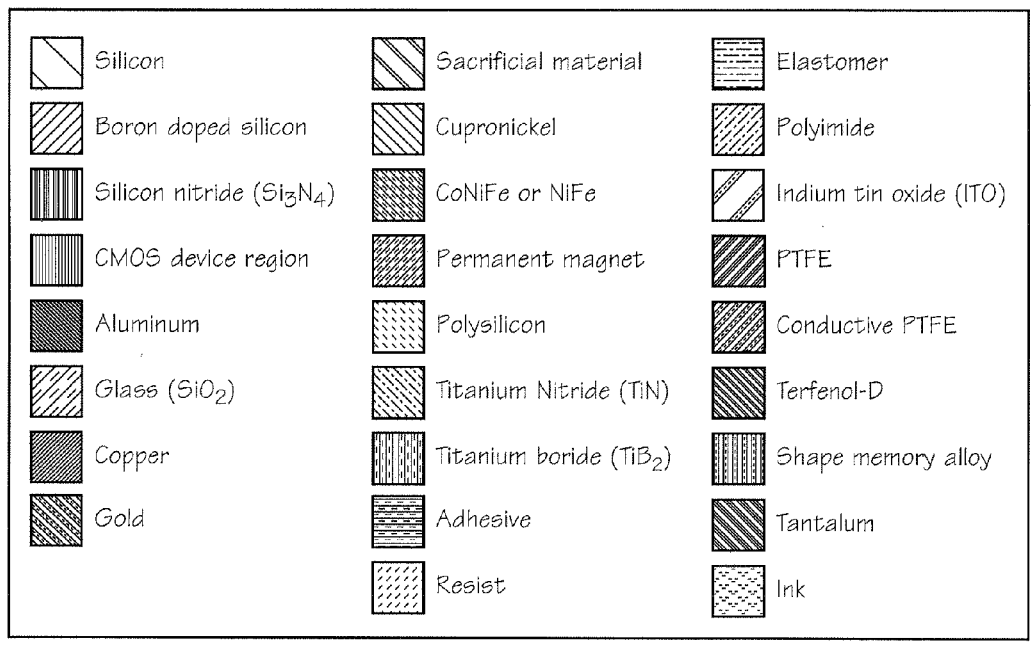
FIG. 38 provides a legend of the materials indicated in FIGS. 39 to 59(a)
Figure 39:
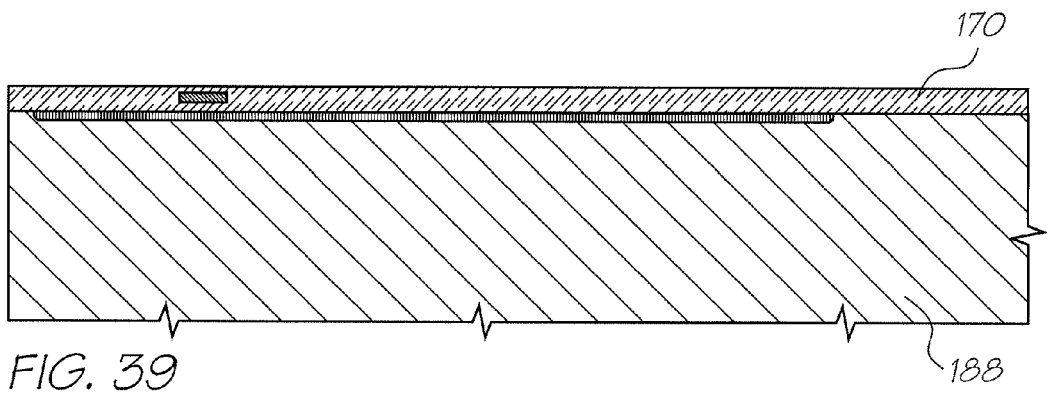
FIGS. 39 to 59(a) illustrate sectional views of the manufacturing steps in one form of construction of the ink jet printhead nozzle of FIG. 36.

One form of detailed manufacturing process which can be used to fabricate monolithic ink jet print heads operating in accordance with the principles taught by the present embodiment can proceed utilizing the following steps:

1. Using a double sided polished wafer 188, complete drive transistors, data distribution, and timing circuits using a 0.5 micron, one poly, 2 metal CMOS process. This step is shown in FIG. 39. For clarity, these diagrams may not be to scale, and may not represent a cross section though any single plane of the nozzle 120. FIG. 38 is a key to representations of various materials in these manufacturing diagrams, and those of other cross-referenced ink jet configurations.

2. Deposit 1 micron of sacrificial material 190.

Figure 40:
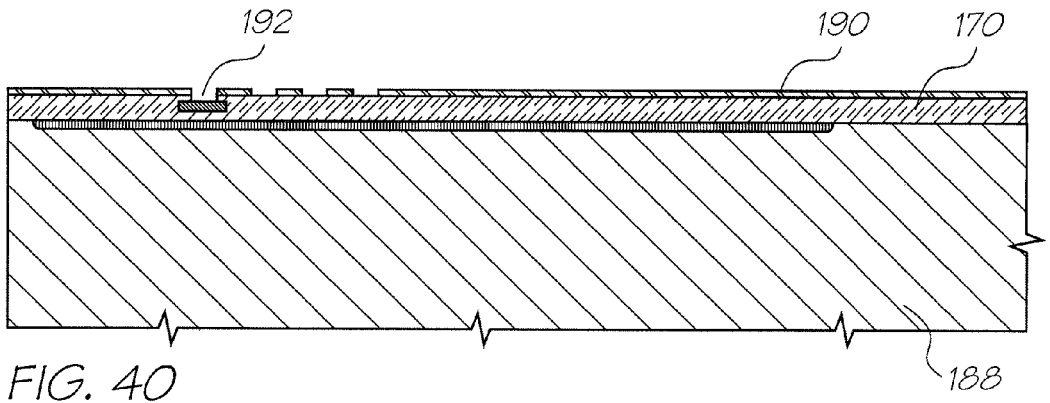

3. Etch the sacrificial material 190 and the CMOS oxide layers down to second level metal using Mask 1. This mask defines contact vias 192 from the second level metal electrodes to the solenoids. This step is shown in FIG. 40.

4. Deposit a barrier layer of titanium nitride (TiN) and a seed layer of copper.

Figure 41:
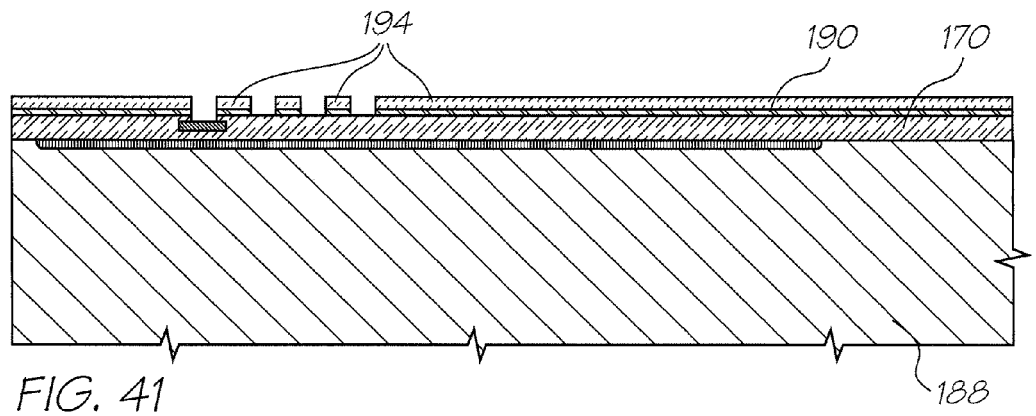

5. Spin on 2 microns of resist 194, expose with Mask 2, and develop. This mask defines the lower side of a solenoid square helix. The resist 194 acts as an electroplating mold. This step is shown in FIG. 41.

6. Electroplate 1 micron of copper 196. Copper is used for its low resistivity (which results in higher efficiency) and its high electromigration resistance, which increases reliability at high current densities.

Figure 42:
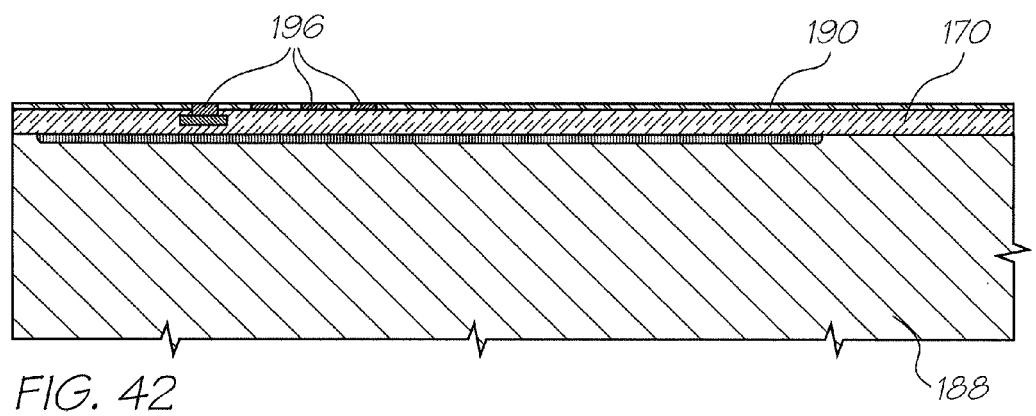

7. Strip the resist 198 and etch the exposed barrier and seed layers. This step is shown in FIG. 42.

8. Deposit 0.1 microns of silicon nitride.

9. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 43:
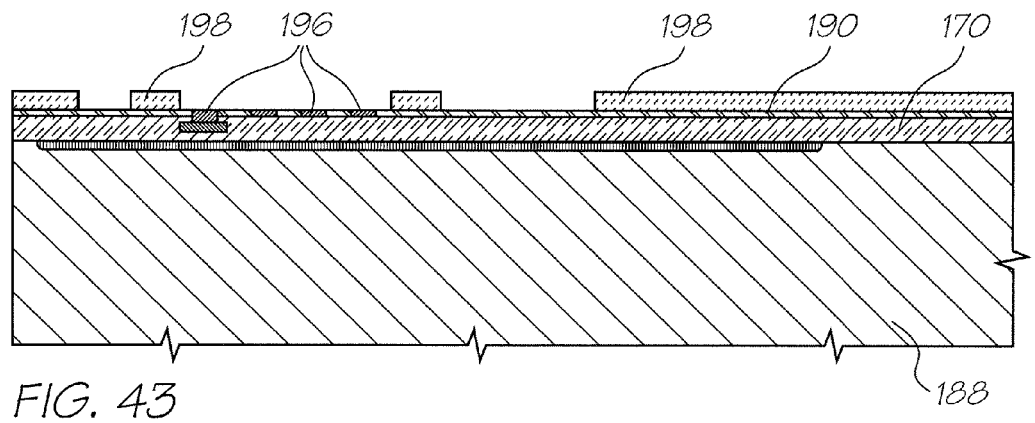

10. Spin on 3 microns of resist 198, expose with Mask 3, and develop. This mask defines all of the soft magnetic parts, being the fixed magnetic pole of the electromagnets, 134 to 156, the moving poles of the linear actuator 128, the horizontal guides 158, 160, and the core of the ink plunger 130. The resist 198 acts as an electroplating mold. This step is shown in FIG. 43.

Figure 44:
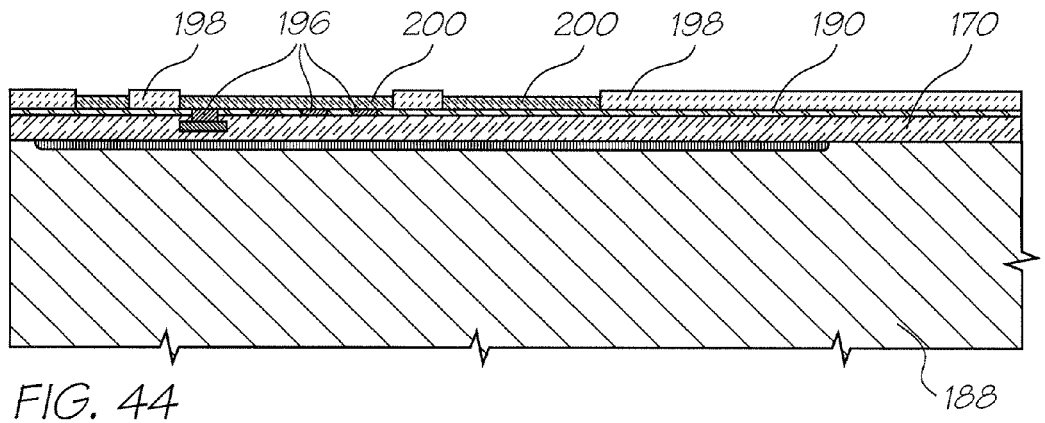

11. Electroplate 2 microns of CoNiFe 200. This step is shown in FIG. 44.

Figure 45:
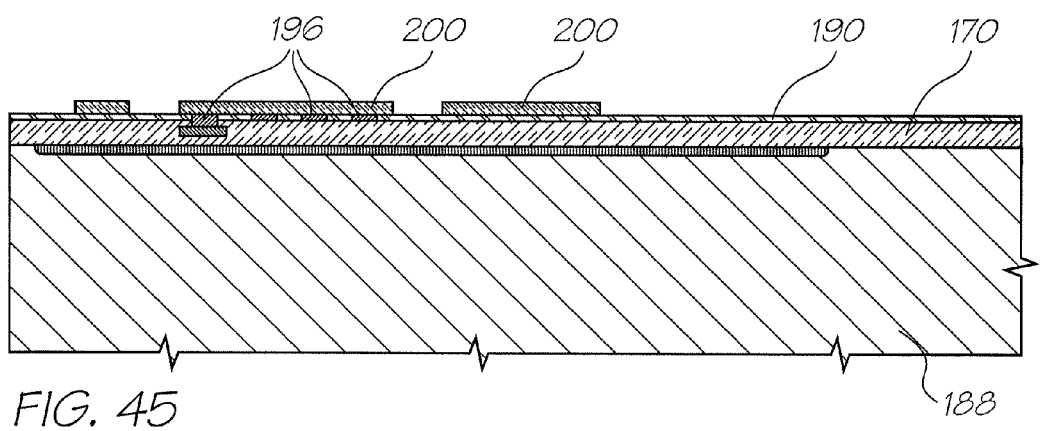

12. Strip the resist 198 and etch the exposed seed layer. This step is shown in FIG. 45.

13. Deposit 0.1 microns of silicon nitride (Si3N4) (not shown).

Figure 46:
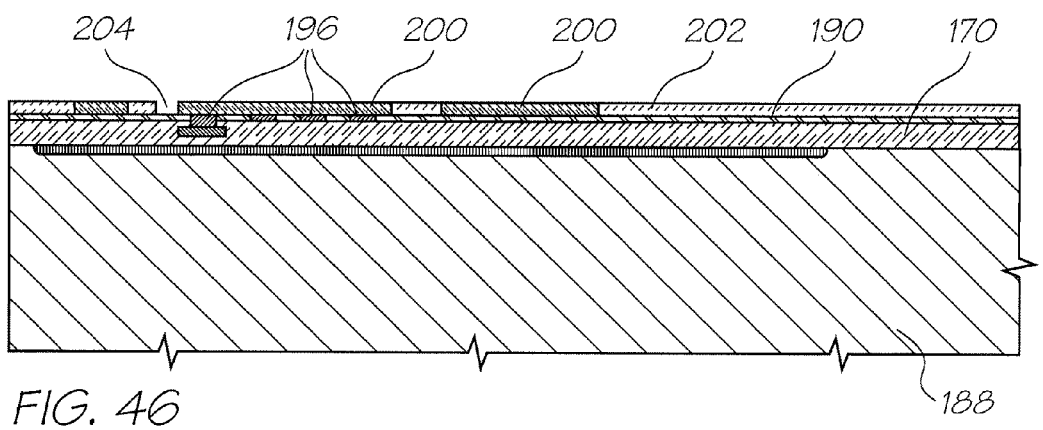

14. Spin on 2 microns of resist 202, expose with Mask 4, and develop. This mask defines solenoid vertical wire segments 204, for which the resist acts as an electroplating mold. This step is shown in FIG. 46.

15. Etch the nitride down to copper using the Mask 4 resist.

Figure 47:
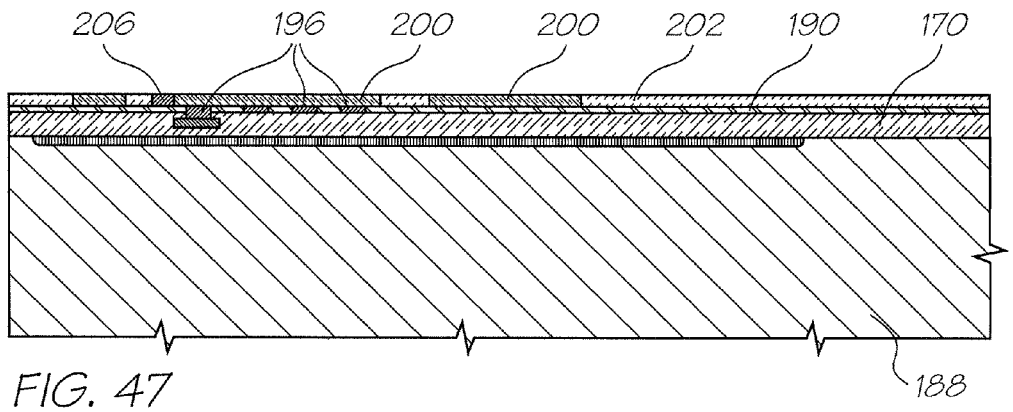

16. Electroplate 2 microns of copper 206. This step is shown in FIG. 47.

17. Deposit a seed layer of copper.

Figure 48:
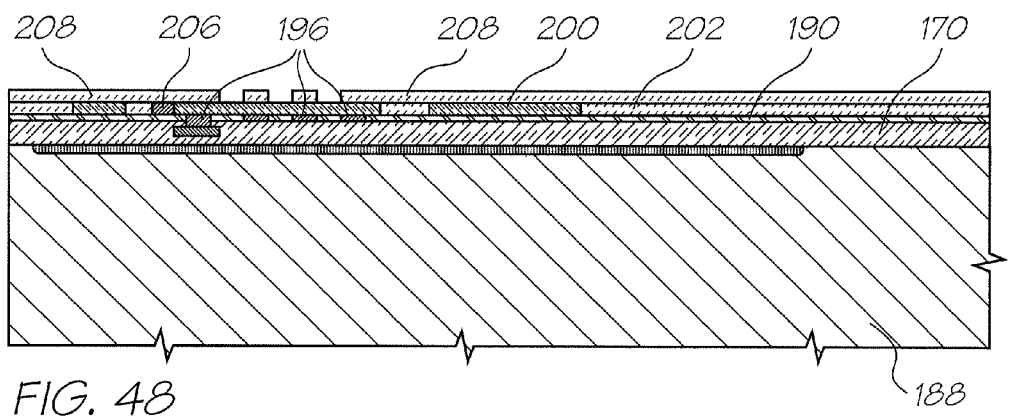

18. Spin on 2 microns of resist 208, expose with Mask 5, and develop. This mask defines the upper side of the solenoid square helix. The resist 208 acts as an electroplating mold. This step is shown in FIG. 48.

Figure 49:
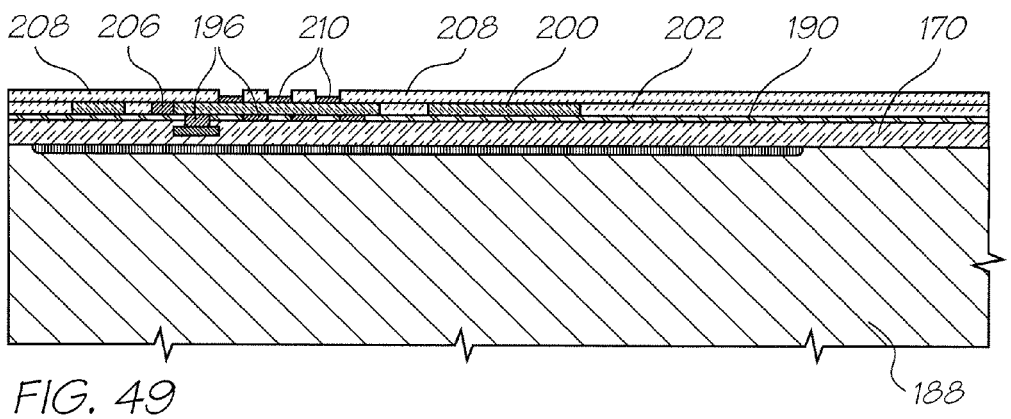

19. Electroplate 1 micron of copper 210. This step is shown in FIG. 49.

Figure 50:
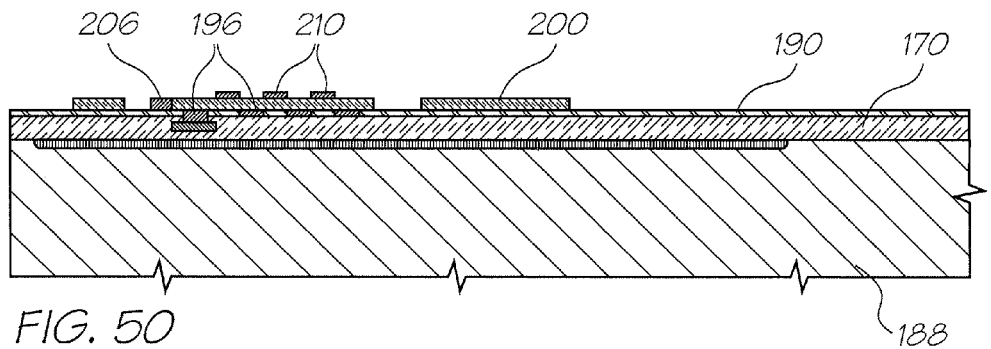

20. Strip the resist and etch the exposed copper seed layer, and strip the newly exposed resist. This step is shown in FIG. 50.

21. Open the bond pads using Mask 6.

22. Wafer probe. All electrical connections are complete at this point, bond pads are accessible, and the chips are not yet separated.

23. Deposit 5 microns of PTFE 212.

Figure 51:
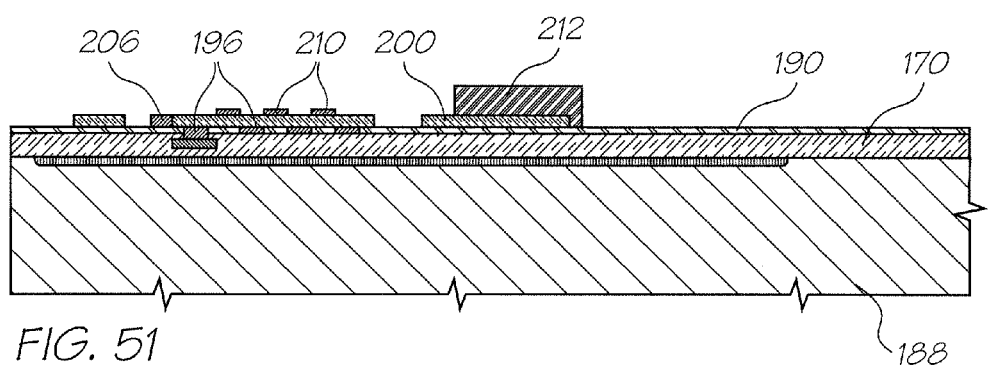

24. Etch the PTFE 212 down to the sacrificial layer using Mask 7. This mask defines the ink plunger 130. This step is shown in FIG. 51.

Figure 52:
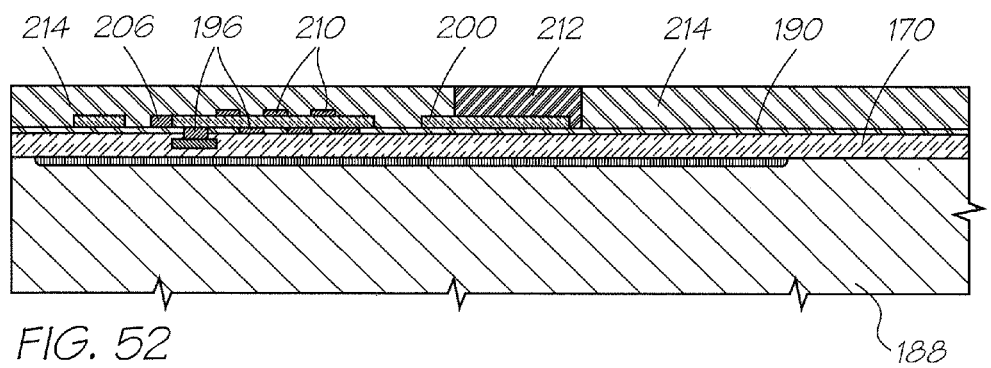

25. Deposit 8 microns of sacrificial material 214. Planarize using CMP to the top of the PTFE ink plunger 130. This step is shown in FIG. 52.

Figure 53:
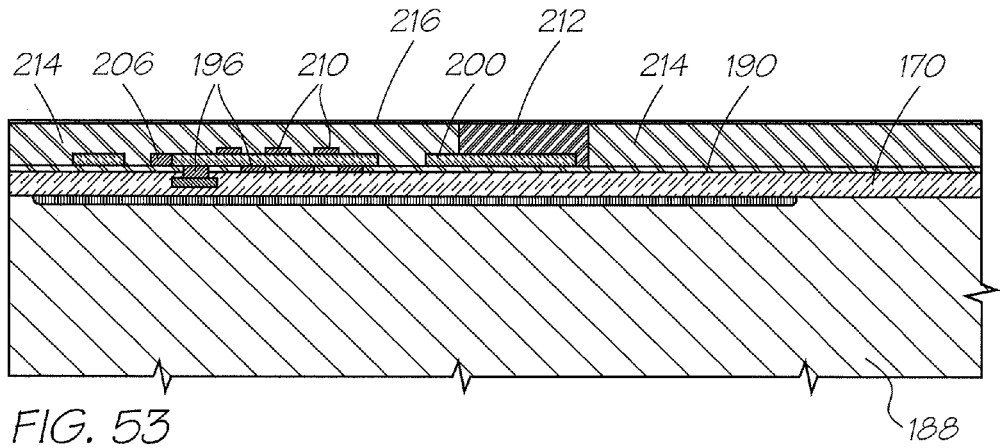

26. Deposit 0.5 microns of sacrificial material 216. This step is shown in FIG. 53.

Figure 54:
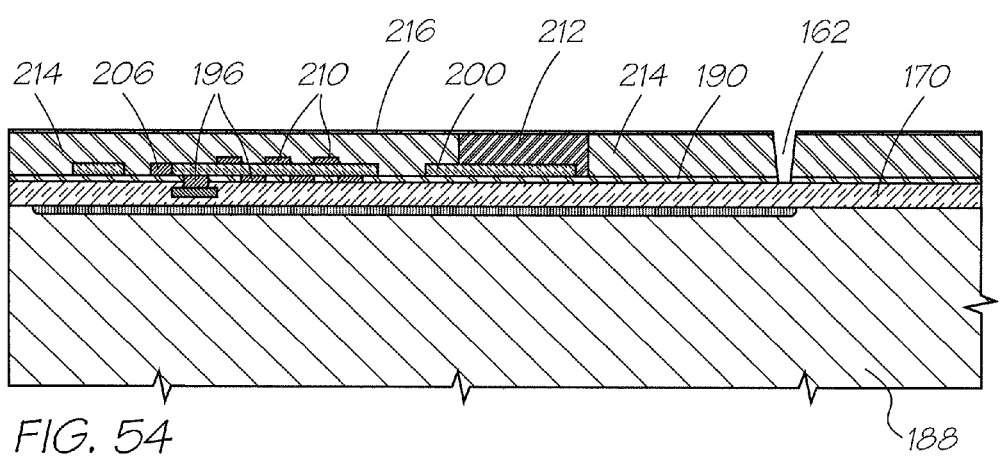

27. Etch all layers of sacrificial material using Mask 8. This mask defines the nozzle chamber walls 162, 164. This step is shown in FIG. 54.

28. Deposit 3 microns of PECVD glass 218.

Figure 55:
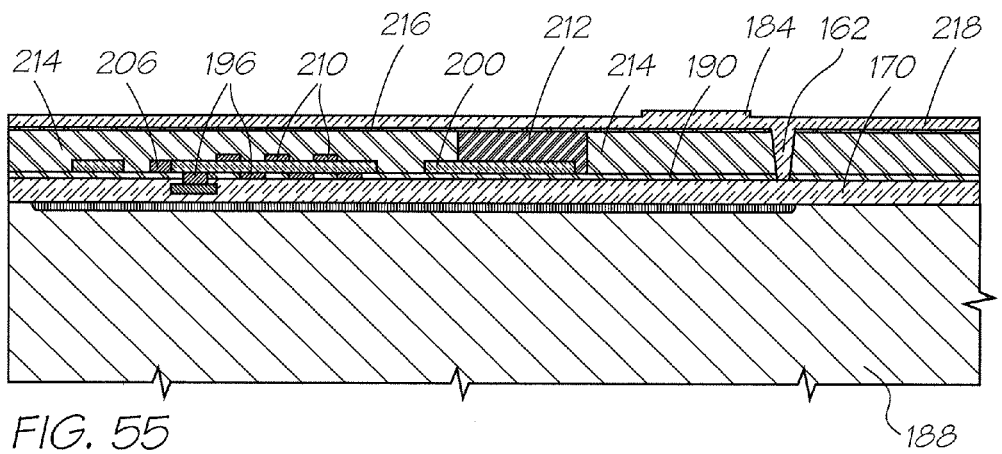

29. Etch to a depth of (approx.) 1 micron using Mask 9. This mask defines the nozzle rim 184. This step is shown in FIG. 55.

Figure 56:
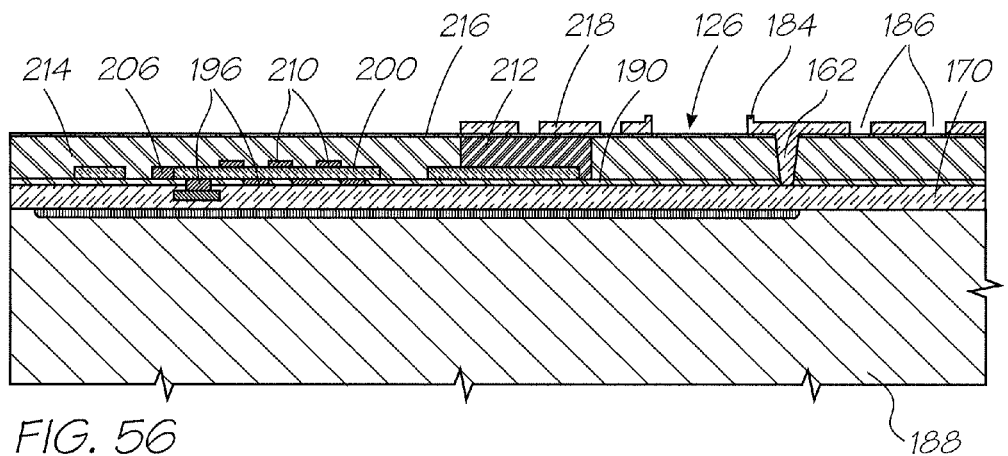

30. Etch down to the sacrificial layer using Mask 10. This mask defines the roof of the nozzle chamber 122, the ink ejection port 126, and the sacrificial etch access apertures 186. This step is shown in FIG. 56.

Figure 57:
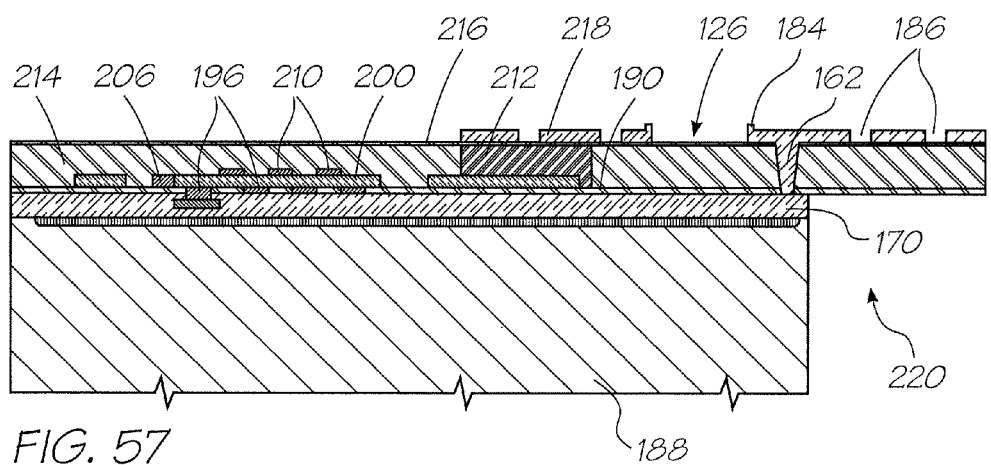

31. Back-etch completely through the silicon wafer (with, for example, an ASE Advanced Silicon Etcher from Surface Technology Systems) using Mask 11. Continue the back-etch through the CMOS glass layers until the sacrificial layer is reached. This mask defines ink inlets 220 which are etched through the wafer 168. The wafer 168 is also diced by this etch. This step is shown in FIG. 57.

Figure 58:
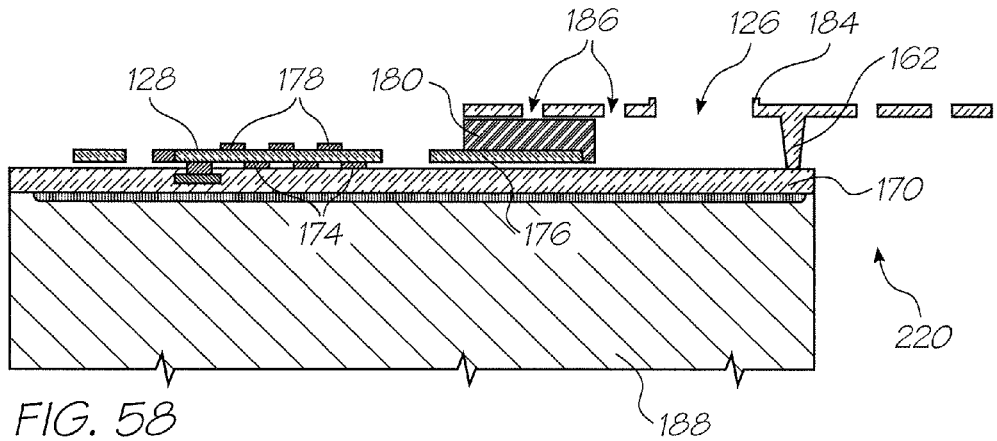

32. Etch the sacrificial material away. The nozzle chambers 122 are cleared, the actuators 128 freed, and the chips are separated by this etch. This step is shown in FIG. 58.

33. Mount the printheads in their packaging, which may be a molded plastic former incorporating ink channels which supply the appropriate color ink to the ink inlets 220 at the back of the wafer. The package also includes a piezoelectric actuator attached to the rear of the ink channels. The piezoelectric actuator provides the oscillating ink pressure required for the ink jet operation.

34. Connect the printheads to their interconnect systems. For a low profile connection with minimum disruption of airflow, TAB may be used. Wire bonding may also be used if the printer is to be operated with sufficient clearance to the paper.

35. Hydrophobize the front surface of the printheads.

Figure 59:
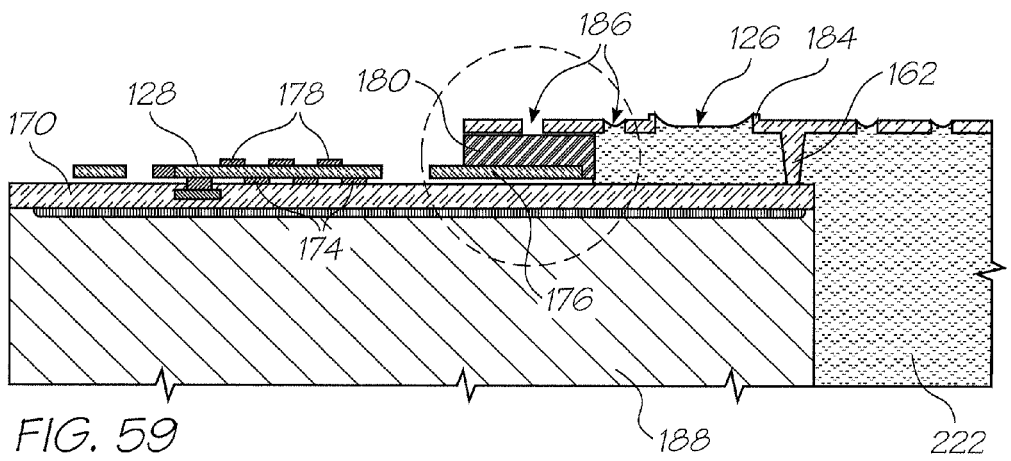
Figure 59A:
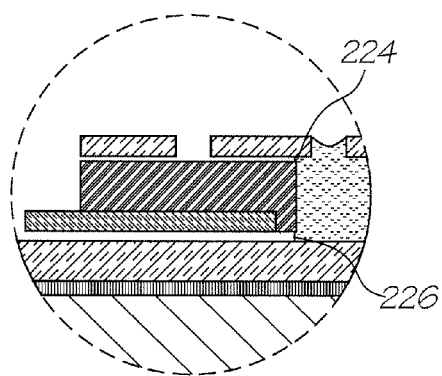

36. Fill the completed printheads with ink 222 and test them. A filled nozzle is shown in FIG. 59.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The presently disclosed ink jet printing technology is potentially suited to a wide range of printing systems including: color and monochrome office printers, short run digital printers, high speed digital printers, offset press supplemental printers, low cost scanning printers, high speed pagewidth printers, notebook computers with inbuilt pagewidth printers, portable color and monochrome printers, color and monochrome copiers, color and monochrome facsimile machines, combined printer, facsimile and copying machines, label printers, large format plotters, photograph copiers, printers for digital photographic 'minilabs', video printers, PHOTO CD (PHOTO CD is a registered trademark of the Eastman Kodak Company) printers, portable printers for PDAs, wallpaper printers, indoor sign printers, billboard printers, fabric printers, camera printers and fault tolerant commercial printer arrays.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. This leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per printhead, but is a major impediment to the fabrication of pagewidth printheads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:

low power (less than 10 Watts)
high resolution capability (1,600 dpi or more)
photographic quality output
low manufacturing cost
small size (pagewidth times minimum cross section)
high speed (<2 seconds per page).

All of these features can be met or exceeded by the ink jet systems described above.

The invention claimed is:

1. A nozzle for an inkjet printer, the nozzle comprising:
   a roof layer which defines a nozzle port through which ink can be ejected;
   an endless substrate layer fast with the roof layer and defining a nozzle chamber wall which tapers inwardly toward the nozzle port; and
   an actuator assembly fast with the endless substrate layer and comprising an endless support, the actuator assembly further comprising a serpentine coil element cantilevered to extend from the endless support, the serpentine coil element configured to bend away from the nozzle port during quiescence and straighten during actuation to eject ink through the nozzle port.

2. A nozzle as claimed in claim 1, wherein the actuator assembly further comprises at least one protective layer mounted to the serpentine coil element.

3. A nozzle as claimed in claim 2, wherein the actuator assembly further comprises a pair of protective layers between which the serpentine coil element is sandwiched.

4. A nozzle as claimed in claim 1, wherein the actuator assembly further comprises a pair of metal interconnects each located between an end of the serpentine coil element and the endless support.

5. A nozzle as claimed in claim 3, wherein the endless support comprises one or more CMOS layers in electrical communication with the metal interconnects.

6. A nozzle as claimed in claim 3, wherein the endless support defines an inner wall of generally quadrilateral shape.

7. A nozzle as claimed in claim 6, wherein the endless support further defines a quartet of slots extending away from respective corners of the inner wall.

* * * * *